US011553319B2

(12) United States Patent
Monteuuis et al.

(10) Patent No.: US 11,553,319 B2
(45) Date of Patent: Jan. 10, 2023

(54) EVALUATING VEHICLE-TO-EVERYTHING (V2X) INFORMATION

(71) Applicant: QUALCOMM Incorporated, San Diego, CA (US)

(72) Inventors: Jean-Philippe Monteuuis, Levallois-Perret (FR); Jonathan Petit, Wenham, MA (US); Mohammad Raashid Ansari, Lowell, MA (US); Cong Chen, Shrewsbury, MA (US)

(73) Assignee: QUALCOMM Incorporated, San Diego, CA (US)

(*) Notice: Subject to any disclaimer, the term of this patent is extended or adjusted under 35 U.S.C. 154(b) by 141 days.

(21) Appl. No.: 17/177,842

(22) Filed: Feb. 17, 2021

(65) Prior Publication Data
US 2022/0264270 A1 Aug. 18, 2022

(51) Int. Cl.
*H04W 4/50* (2018.01)
*H04W 4/38* (2018.01)
*H04W 4/40* (2018.01)
*H04W 4/12* (2009.01)

(52) U.S. Cl.
CPC ............ *H04W 4/50* (2018.02); *H04W 4/12* (2013.01); *H04W 4/38* (2018.02); *H04W 4/40* (2018.02)

(58) Field of Classification Search
CPC ........... H04W 4/50; H04W 4/12; H04W 4/38; H04W 4/40; B60W 30/08; G08G 1/166
See application file for complete search history.

(56) References Cited

U.S. PATENT DOCUMENTS

2019/0232972 A1 8/2019 Lin et al.
2020/0377081 A1* 12/2020 Wågström ............ B60R 21/013

FOREIGN PATENT DOCUMENTS

WO WO-2012152746 A1 * 11/2012 .............. G01C 3/06
WO WO-2020078550 A1 * 4/2020 ........... G08G 1/0108

OTHER PUBLICATIONS

International Search Report and Written Opinion—PCT/US2021/065504—ISA/EPO—dated Apr. 11, 2022.
Qualcomm Technologies Int: "Chinese SCMS White Paper Including MBR Discussion", ETSI Draft, ITSWG5 (21)057010, European Telecommunications Standards Institute (ETSI), 650, Route Des Lucioles, F-06921 Sophia-Antipolis Cedex, France, vol. WG ITS WG5 Security Jan. 19, 2021, pp. 1-72, XP014392957.

* cited by examiner

*Primary Examiner* — Farid Seyedvosoghi
(74) *Attorney, Agent, or Firm* — The Marbury Law Group, PLLC

(57) ABSTRACT

Embodiments include methods performed by vehicle-to-everything (V2X) system for evaluating V2X information. Some embodiments may include receiving from a V2X entity a length value and width value of the V2X entity, determining whether the received length value and width value are reliable, and performing a position overlap check using the received length value and width value in response to determining that the received length value and width value are reliable.

27 Claims, 20 Drawing Sheets

EVALUATING VEHICLE-TO-EVERYTHING (V2X) INFORMATION

BACKGROUND

Intelligent Transportation Systems (ITS) aim to provide services relating to different modes of transport and traffic management, enable users to be better informed and make safer, more coordinated, and "smarter" use of transport networks. These transport networks include advanced telematics and hybrid communications including Internet Protocol (IP)-based communications as well as Ad-Hoc direct communication between vehicles and between vehicles and infrastructure. A Cooperative-ITS (C-ITS) is under development to improve road safety and pave the way towards the realization of full autonomous driving based on the exchange of information via direct wireless short range communications dedicated to C-ITS and Road Transport and Traffic Telematics (RTTT). Multiple regions of the world are developing standards for vehicle-based communication systems and functionality, including standards developed by the Institute of Electrical and Electronics Engineers (IEEE) and Society of Automotive Engineers (SAE) for use in North America, and by the European Telecommunications Standards Institute (ETSI) and European Committee for Standardization (CEN) for use in Europe. Included in such systems is the ability for a vehicle to broadcast messages that other vehicles can receive and process to improve traffic safety. Such messages are termed Basic Safety Messages (BSM) in North America or Cooperative Awareness Messages (CAM) in Europe (collectively referred to herein as BSM messages for conciseness).

The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc. Other V2X wireless technologies are also under consideration in different regions of the world. The techniques described in this patent are applicable to any V2X wireless technology.

An element of V2X systems is the ability for a vehicle to broadcast Basic Safety Messages (BSM) in North America or Cooperative Awareness Messages (CAM) in Europe, which other vehicles can receive and process to improve traffic safety. The processing of such messages in the transmitting and receiving vehicles occurs in onboard equipment that provide the vehicle-to-everything (V2X) functionality (referred to herein as "V2X onboard equipment").

In V2X communications, it is important that inaccurate, corrupted, or hacked (i.e., bad) data is detected in order to prevent such inaccurate data from further dissemination. However, as an increasing number of vehicles are equipped to participate in such networks, the volume of potential inaccurate or spurious data is large and growing at an exponential rate.

SUMMARY

Various aspects include methods of evaluating vehicle-to-everything (V2X) information performed by a V2X processing device of a vehicle. Various aspects may include receiving from a V2X entity in a first message a length value and width value of the V2X entity, determining whether the received length value and width value are reliable, performing a position overlap check using the received length value and width value in response to determining that the received length value and width value are reliable. In some aspects, determining whether the received length value and width value are reliable may include, determining whether the width value is less than or equal to the length value, and determining that the received length value and width value are not reliable in response to determining that the received width value exceeds the received length value.

Some aspects may further include receiving a cooperative Intelligent Transportation System service (C-ITSS) type value from the V2X entity in the first message, in which determining whether the received length value and width value are reliable may include: receiving from the V2X entity in a second message another length value, another width value, and another C-ITSS type value of the V2X entity, determining whether the length values, width values, and C-ITSS type values received in the first and second messages match, and determining that the received length value and width value are not reliable in response to determining that one or more of the length values, width values, or C-ITSS type values received in the first and second messages do not match.

In some aspects, determining whether the received length value and width value are reliable may include, comparing the received length value and width value to a length value and width value determined using a vehicle sensor, and determining that the length value and width value determined using the vehicle sensor are not reliable in response to determining that the received length value and width value and the length value and width value determined using a vehicle sensor do not match.

Some aspects may further include in response to determining that the received length value and width value are not reliable, determining for the V2X entity a model stored in the V2X system, in which the model may include a model length value and a model width value, and performing the position overlap check using the model length value and model width value.

Some aspects may further include receiving a heading measurement from a wireless device in the vehicle, determining a vehicle heading, determining whether a difference between the heading measurement and a vehicle heading exceeds a threshold difference, determining that the vehicle heading is reliable in response to determining that the difference between the heading measurement and the vehicle heading does not exceed the threshold difference, and determining that the vehicle heading is not reliable in response to determining that the difference between the heading measurement and the vehicle heading exceeds the threshold difference. In some aspects, performing the position overlap check may include performing the position overlap check using the vehicle heading in response to determining that the vehicle heading is reliable. Some aspects may further include monitoring variations in the vehicle heading over a period of time, determining that the vehicle heading is reliable in response to determining that variations in the vehicle heading over the period of time does not exceed a variation threshold, and determining that the vehicle heading is not reliable in response to determining that variations in the vehicle heading over the period of time exceeds the variation threshold. In some aspects, determining whether a difference between the heading measurement and a vehicle heading exceeds a threshold difference may include determining whether the difference between the heading measurement and the vehicle heading is within a left deviation threshold and a right deviation threshold, determining that the vehicle heading is reliable may include determining that the vehicle heading is reliable in response to determining that the difference between the heading measurement and the vehicle heading is within the left deviation threshold and the right deviation threshold, and determining that the vehicle heading is not reliable may include determining that the vehicle heading is not reliable in response to determining that the difference between the wireless device heading and the vehicle heading is not within the left deviation threshold and the right deviation threshold.

Further aspects include a V2X system including a memory and a processor configured to perform operations of any of the methods summarized above. Further aspects may include a V2X system having various means for performing functions corresponding to any of the methods summarized above. Further aspects may include a non-transitory processor-readable storage medium having stored thereon processor-executable instructions configured to cause a processor of a V2X system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
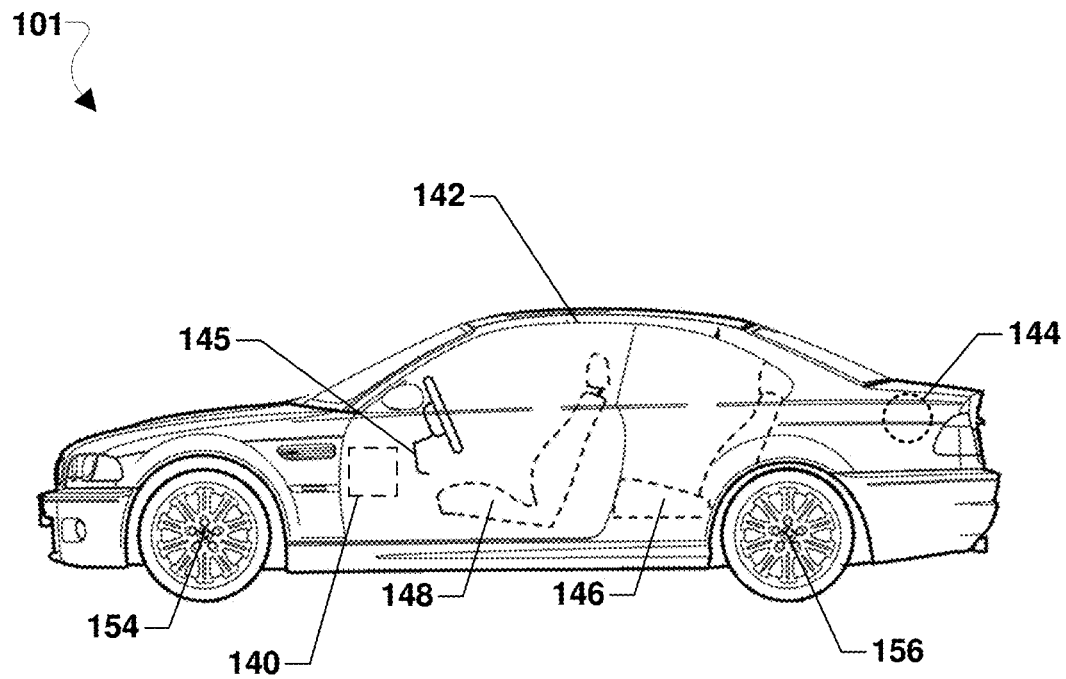
FIGS. 1A and 1B are component block diagrams illustrating a vehicle suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "mobile device" and "wireless device" are used herein to refer to any one or all of wireless router devices, wireless appliances, cellular telephones, smartphones, portable computing devices, personal or mobile multimedia players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

As used in this application, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

In overview, various embodiments include methods and systems of evaluating vehicle-to-everything (V2X) information for reliability. As used herein, V2X information is "reliable" when the information exhibit sufficient accuracy to be safe to use for a safety-related determination. As further described below, some embodiments may evaluate V2X information for reliability in the detection of an overlap condition between a vehicle and another V2X entity, such as another vehicle, a pedestrian, and the like.

An overlap condition occurs when a dimensional boundary of one entity (e.g., vehicle or pedestrian) overlaps a dimensional boundary of another entity. Such a condition would indicate that the entities are within a threshold proximity, and may, for example, have collided or be about to collide. A wide variety of entity dimensions exists. Entities may be of different types (e.g., vehicle vs. pedestrian, car vs. truck vs. motorcycle vs. bicycle, etc.) each having different dimensions (e.g., length and width). Moreover, different models of each type, and different people, may have varying dimensions (length and width). Further, even vehicles of the same model may be customized to have different dimensions (e.g., length and width).

If a vehicle detects an overlap condition, the vehicle may respond by, for example, maneuvering to avoid a collision, performing a hard braking maneuver, accelerating away from an imminent collision, and the like. Accurate knowledge of entity dimensions is necessary to determine accurately whether an overlap condition has occurred. Similarly, information such as heading or orientation of the vehicle may be important in determining accurately whether an overlap condition has occurred. Conventionally, a vehicle relies on V2X information provided by other V2X entities (e.g., other vehicles, pedestrians, roadside units (RSUs), etc.). However, a malfunctioning device, such as a sensor or other device on another entity, may provide inaccurate V2X information, such as an inaccurate length or width. Also, a malicious actor may inject corrupted or inaccurate data into the system (e.g., by hacking a V2X entity). Inaccurate entity dimension information may cause a vehicle to detect an overlap condition where one does not exist (i.e., to falsely detect an overlap condition), which may lead the vehicle to perform a sudden maneuver that itself creates a dangerous situation for the vehicle or for nearby vehicles or pedestrians. Further, inaccurate heading or orientation information may cause a vehicle to falsely detect an overlap condition, or may adversely affect the vehicle's maneuver to avoid or mitigate the falsely detected overlap condition.

Various embodiments include methods and V2X systems configured to perform the methods of evaluating V2X information to determine whether the dimensions of a V2X entity are reliable. In various embodiments, a V2X system may receive from a V2X entity (e.g., another vehicle, a pedestrian, an RSU, or another V2X entity) a length value and width value of the V2X entity, determine whether the received length value and width value are reliable, and perform a position overlap check using the received length value and width value in response to determining that the received length value and width value are reliable. In some embodiments, the V2X system may determine whether the width value is less than or equal to the length value. As further described below, for most V2X entities, their length is greater than their width (e.g., a car is almost always longer than it is wide). Further, in most cases, even a pedestrian has (or is presumed for V2X purposes to have) a width that is, at most, equal to its length. In this manner, determining that V2X information indicates that a V2X entity has a width greater than its length may serve as a test to determine whether such V2X information is reliable. In some embodiments, in response to determining that the received length value and width value are not reliable, the V2X system may determine for the V2X entity a model that includes a model length value and a model width value. For example, the model may be stored in a memory of the V2X system. In such embodiments, the V2X system may perform the position overlap check using the model length value and model width value.

In some embodiments, the V2X system may compare the received length value and width value to a length value and width value determined using a vehicle sensor. In response to determining that the received length value and width value and the length value and width value determined using a vehicle sensor do not match, the V2X system may determine that the length value and width value determined using the vehicle sensor are not reliable. In this manner, the V2X system may use such comparison to check the reliability of the vehicle sensor information. In some embodiments, the V2X system may determine that a received width value exceeds a threshold, and may determine that the receive width value is not reliable in response to determining that the received width value exceeds the threshold. For example, the vehicle may be configured (e.g., in memory) with a maximum width threshold, such that a received width that exceeds the width threshold is deemed unreliable. In some embodiments, maximum width threshold may be indicated in a technical standard or protocol.

In some embodiments, the V2X system may perform a check to determine whether its heading information is reliable. In some embodiments, the V2X system may receive a heading measurement from a wireless device in the vehicle, and may determine a vehicle heading. The V2X system may determine whether a difference between the heading measurement and a vehicle heading exceeds a threshold difference. In response to determining that the difference between the heading measurement and the vehicle heading does not exceed the threshold difference, the V2X system may determine that the vehicle heading is reliable in response to determining that the difference between the heading measurement and the vehicle heading does not exceed the threshold difference. In response to determining that the difference between the heading measurement and the vehicle heading exceeds the threshold difference, the V2X system may determine that the vehicle heading is not reliable.

In some embodiments, the V2X system may determine whether the difference between the heading measurement and the vehicle heading is above a minimum deviation threshold and is below a maximum deviation threshold. In response to determining that the difference between the heading measurement and the vehicle heading is greater than the minimum deviation threshold and less than the maximum deviation threshold, the V2X system may determine that the vehicle heading is reliable comprises determining that the vehicle heading is reliable. In response to determining that the difference between the wireless device heading and the vehicle heading is greater than the maximum deviation threshold or less than the minimum deviation threshold, the V2X system may determine that the vehicle heading is not reliable comprises determining that the vehicle heading is not reliable.

In some embodiments, the V2X system may perform a check over time to determine whether its heading information is reliable. In some embodiments, the V2X system may monitor variations in the vehicle heading over a period of time, and may determine that the vehicle heading is reliable in response to determining that variations in the vehicle heading over the period of time does not exceed a variation threshold. In response to determining that variations in the vehicle heading over the period of time exceeds the variation threshold, the V2X system may determine that the vehicle heading is not reliable. In some embodiments, the V2X system may perform a position overlap check using the vehicle heading in response to determining that the vehicle heading is reliable.

For conciseness, various embodiments are described in the context of surface travel (e.g., roadway) within two dimensions. Thus, vehicle dimensions may be referred to as length and width. One of ordinary skill in the art would recognize that vehicle travel may encompass three dimensions of travel (e.g., flying drones/vehicles and/or floating/nautical/submersible vehicles). The various embodiments disclosed herein are not intended to be limited to surface travel. The various embodiments described below may include three dimensional boundaries that include (length, width and height). Overlap conditions may occur when portions of another entity's dimensional boundary overlaps another entity's dimensional boundary in any of length, width, and height.

Some embodiments are described in this application as performed by a V2X system participant operating within V2X terminologies. However, it should be understood that various embodiments encompass any or all of the V2X/V2V or vehicle-based communication standards, messages or technologies. As such, nothing in the application should be construed to limit the claims to V2X/V2V systems unless expressly recited as such in the claims. In addition, the embodiments described herein discuss onboard equipment to perform V2X/V2V communication. In V2X/V2V systems, system participant equipment may include, but is not limited to, vehicle on-board equipment, mobile devices, and RSUs. RSUs may include stationary devices such as traffic signals, roadside beacons, traffic cameras, etc. Each of system participant equipment may broadcast information to other system participant equipment.

For example, a vehicle may contain on-board/in-dash equipment and sensors that report on vehicle conditions (e.g., location, orientation, speed, dimensions, etc.). A mobile device carried by a pedestrian or vehicle rider (e.g., motorcycle, car, bicycle rider) may contain sensors that report on pedestrian conditions (e.g., location, orientation, speed, dimensions, etc.). Each of the vehicle, pedestrian and road side units (RSU) may be a V2X system participant. The processor contained in the in-dash/onboard unit or mobile device may be considered the V2X system participant processor. The V2X communication among V2X system participant equipment may allow applications executing on each V2X system participant equipment to provide vehicles and pedestrians with safety applications (e.g., applications that may determine imminent hazards such as a vehicle hard-braking or speeding out of a blind cross-street) or mobility (planning for traffic signal changes), or provide other useful functions within the vehicular transportation system as a whole. For ease of reference, various embodiments are described herein with frequent reference to vehicles (e.g., automobiles). Such examples of V2X entities are not intended to limit the claims or the embodiments for use with vehicles. Rather the embodiments described herein may be used by any V2X system participant to detect overlap conditions with any other V2X system participant.

Figure 1B:
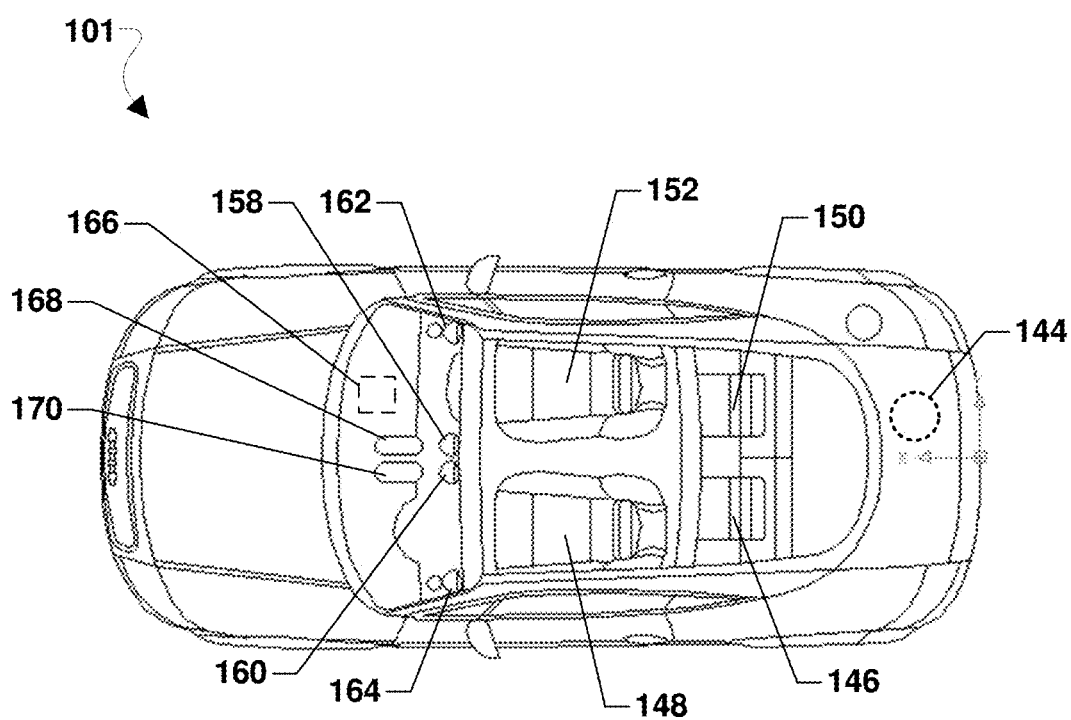

Various embodiments may be implemented within a variety of V2X system participants, an example vehicle 101 of which is illustrated in FIGS. 1A and 1B. With reference to FIGS. 1A and 1B, a vehicle 101 may include a control unit 140 and a plurality of sensors 144-170, including satellite geopositioning system receivers 142, occupancy sensors 144, 146, 148, 150, 152, tire pressure sensors 154, 156, cameras 158, 160, microphones 162, 164, impact sensors 166, radar 168, and lidar 170. The plurality of sensors 144-170, disposed in or on the vehicle, may be used for various purposes, such as autonomous and semi-autonomous navigation and control, crash avoidance, position determination, etc., as well to provide sensor data regarding objects and people in or on the vehicle 101. The sensors 144-170 may include one or more of a wide variety of sensors capable of detecting a variety of information useful for navigation and collision avoidance. Each of the sensors 144-170 may be in wired or wireless communication with a control unit 140, as well as with each other. In particular, the sensors may include one or more cameras 158, 160 or other optical sensors or photo optic sensors. The sensors may further include other types of object detection and ranging sensors, such as radar 168, lidar 170, IR sensors, and ultrasonic sensors. The sensors may further include tire pressure sensors 154, 156, humidity sensors, temperature sensors, satellite geopositioning sensors 142, control input sensors 145, accelerometers, vibration sensors, gyroscopes, gravimeters, impact sensors 166, force meters, stress meters, strain sensors, fluid sensors, chemical sensors, gas content analyzers. pH sensors, radiation sensors. Geiger counters, neutron detectors, biological material sensors, microphones 162, 164, occupancy sensors 144, 146, 148, 150, 152, proximity sensors, and other sensors.

The vehicle control unit 140 may be configured with processor-executable instructions to perform navigation and collision avoidance operations using information received from various sensors, particularly the cameras 158, 160. In some embodiments, the control unit 140 may supplement the processing of camera images using distance and relative position (e.g., relative bearing angle) that may be obtained from radar 168 and/or lidar 170 sensors. The control unit 140 may further be configured to control steering, breaking and speed of the vehicle 101 when operating in an autonomous or semi-autonomous mode using information regarding other vehicles determined using various embodiments.

Figure 1C:
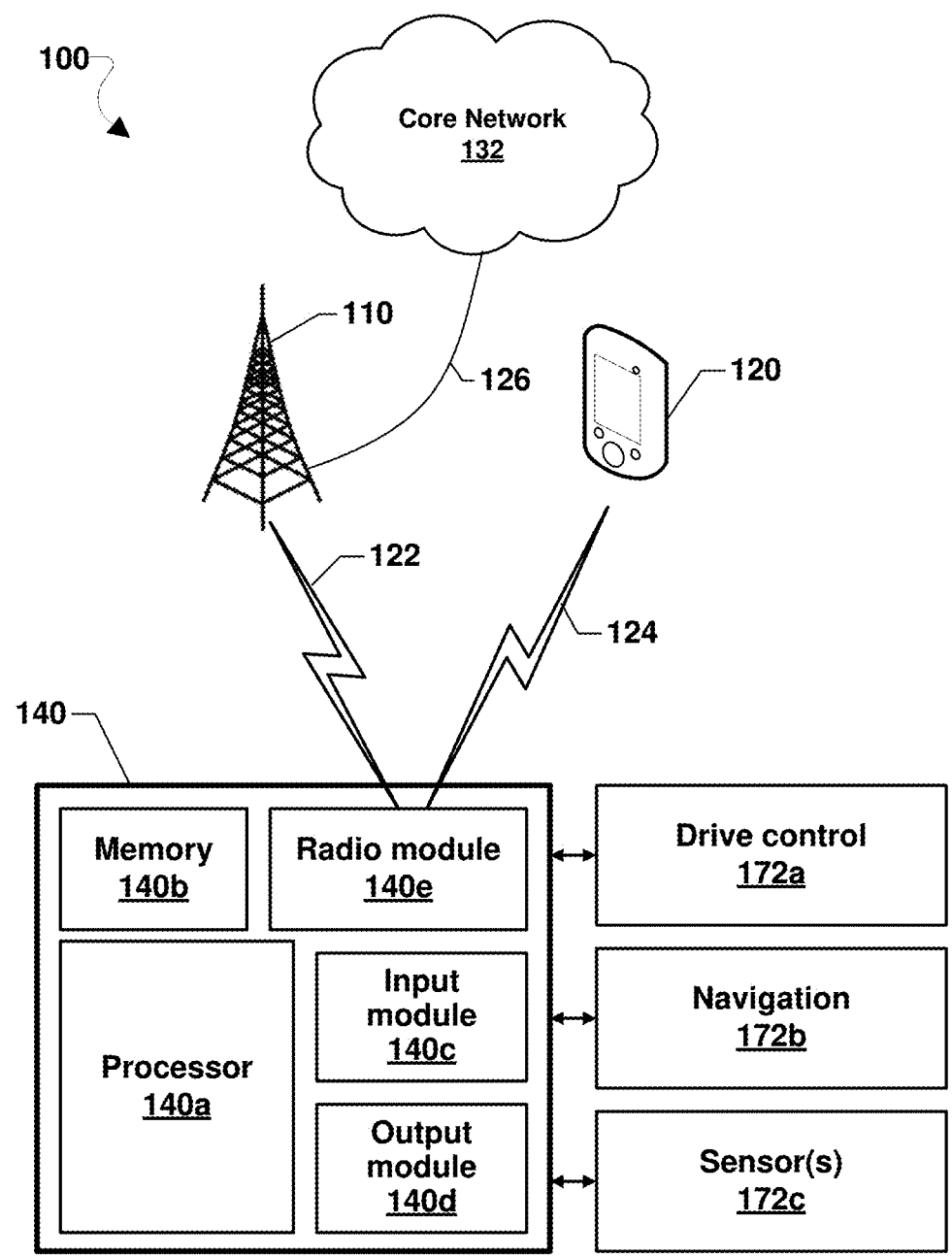
FIG. 1C is a component block diagram illustrating components of a vehicle suitable for implementing various embodiments.

FIG. 1C is a component block diagram illustrating a communication system 100 of components and support systems suitable for implementing various embodiments. With reference to FIGS. 1A-1C, a vehicle 101 may include a control unit 140, which may include various circuits and devices used to control the operation of the vehicle 101. In the example illustrated in FIG. 1D the control unit 140 includes a processor 140a, memory 140b, an input module 140c, an output module 140d and a radio module 140e. The control unit 140 may be coupled to and configured to control drive control components 172a, navigation components 172b, and one or more sensors 172c of the vehicle 101. The processor 140a that may be configured with processor-executable instructions to control maneuvering, navigation, and/or other operations of the vehicle 101, including operations of various embodiments. The processor 140a may be coupled to the memory 140b.

The radio module 140e may be configured for wireless communication. The radio module 140e may exchange signals (e.g., command signals for controlling maneuvering, signals from navigation facilities, etc.) via the communication link 122 with a network transceiver (e.g., the base station 110), and may provide the signals to the processor 140a and/or the navigation unit 172b. In some embodiments, the radio module 140e may enable the vehicle 101 to communicate with a wireless communication device 120 through the wireless communication link 124. The wireless communication link 124 may be a bidirectional or unidirectional communication link, and may use one or more communication protocols, as described.

The input module 140c may receive sensor data from one or more vehicle sensors 172c as well as electronic signals from other components, including the drive control components 172a and the navigation components 172b. The output module 140d may communicate with or activate various components of the vehicle 101, including the drive control components 172a, the navigation components 172b, and the sensor(s) 172c.

The control unit 140 may be coupled to the drive control components 172a to control physical elements of the vehicle 101 related to maneuvering and navigation of the vehicle, such as the engine, motors, throttles, steering elements, flight control elements, braking or deceleration elements, and the like. The drive control components 172a may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 172b, and may receive data from the navigation components 172b and be configured to use such data to determine the present position and orientation of the vehicle 101, as well as an appropriate course toward a destination. The navigation components 172b may include or be coupled to a global navigation satellite system (GNSS) receiver system (e.g., one or more Global Positioning System (GPS) receivers) enabling the vehicle 101 to determine its current position using GNSS signals. Alternatively, or in addition, the navigation components 172b may include radio navigation receivers for receiving navigation beacons or other signals from radio nodes, such as Wi-Fi access points, cellular network sites, radio station, remote computing devices, other vehicles, etc. Through control of the drive control elements 172a, the processor 140a may control the vehicle 101 to navigate and maneuver. The processor 140a and/or the navigation components 172b may be configured to communicate with a network element such as a server in a communication network (e.g., the core network 132) via the wireless communication link 122, 126 to receive commands to control maneuvering, receive data useful in navigation, provide real-time position reports, and assess other data.

The control unit 140 may be coupled to one or more sensors 172c. The sensor(s) 172c may include the sensors 144-170 as described, and may the configured to provide a variety of data to the processor 140a.

While the control unit 140 is described as including separate components, in some embodiments some or all of the components (e.g., the processor 140a, the memory 140b, the input module 140c, the output module 140d, and the radio module 140e) may be integrated in a single device or module, such as a system-on-chip (SOC) processing device. Such an SOC processing device may be configured for use in vehicles and be configured, such as with processor-executable instructions executing in the processor 140a, to perform operations of navigation and collision avoidance using local dynamic map (LDM) data when installed in a vehicle.

Figure 1D:
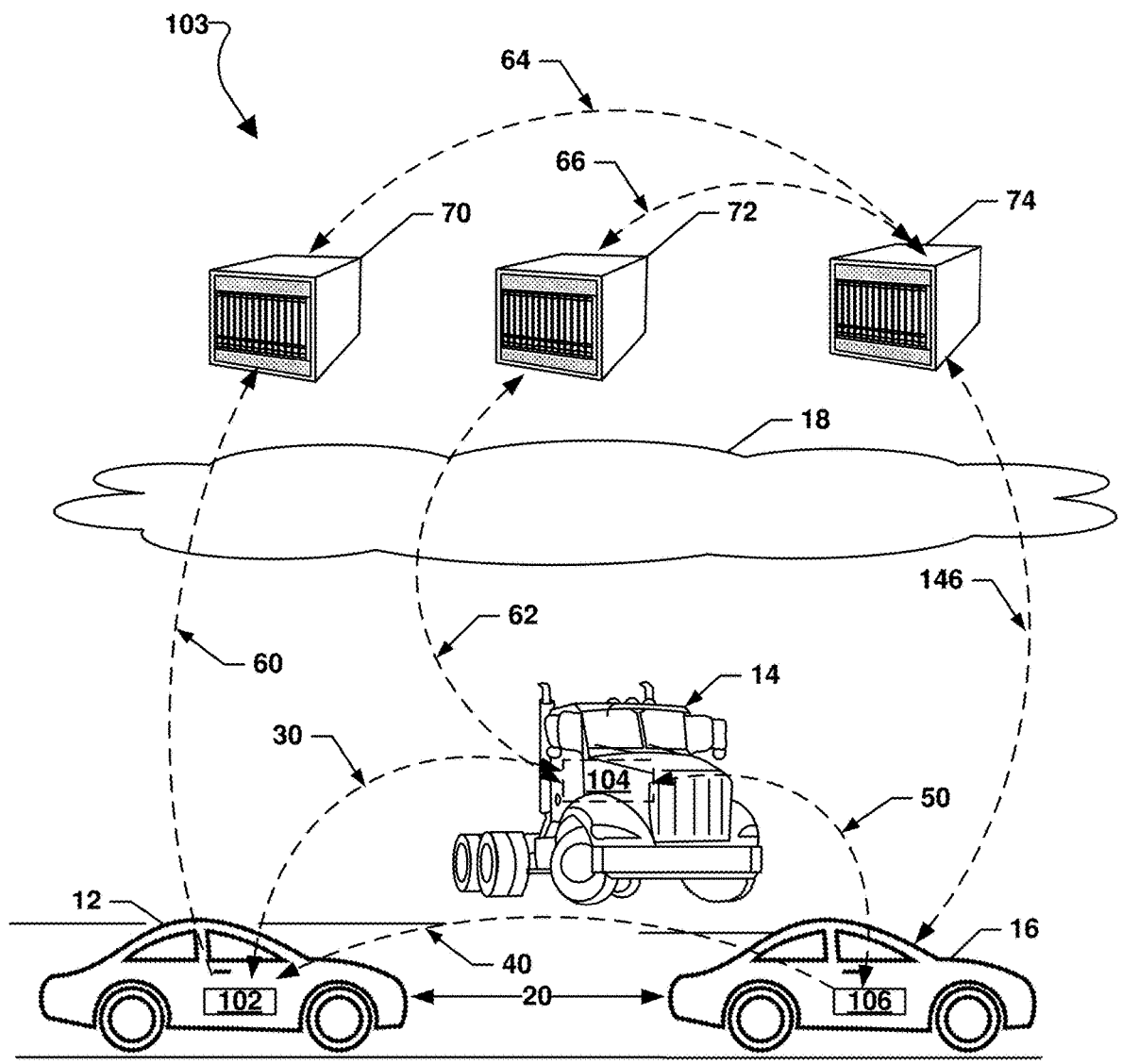
FIG. 1D is a schematic block diagram illustrating a subset of a V2X communication system suitable for implementing various embodiments.

FIG. 1D illustrates a portion of the V2X system 103 including three vehicles, 12, 14, 16. In the illustrated example, each vehicle 12, 14, 16 includes V2X onboard equipment 102, 104, 106, respectively, that are configured to periodically broadcast Basic Safety Messages 30, 40, 50 for receipt and processing by other vehicles' onboard equipment (e.g., 102, 104, 106). By sharing the vehicle location, speed, direction, braking, and other information, vehicles can maintain safe separation and identify and avoid potential collisions. For example, a trailing vehicle 12 receiving Basic Safety Messages 40 from a leading vehicle 16 can determine the speed and location of the vehicle 16, which in turn enables vehicle 12 to match the speed and maintain a safe separation distance 20. By being informed through Basic Safety Messages 40 when the leading vehicles 16 applies the brakes, the V2X equipment 102 in the trailing vehicle 12 can apply brakes simultaneously to maintain the safe separation distance 20 even when the leading vehicle 16 stops suddenly. As another example, the V2X equipment 104 within the truck vehicle 14 may receive Basic Safety Messages 30, 50 from the two vehicles 12, 16, and thus be informed that the truck vehicle 14 should stop at the intersection to avoid a collision. Each of the vehicle V2X on-board equipment 102, 104, 106 may communicate with one another using any of a variety close proximity communication protocols. In addition, the vehicles may be able to transmit data and information regarding detected Basic Safety Messages as well as a misbehavior report (MBR) about detected misbehavior to an original equipment manufacturer (OEM) (70, 72) and/or remote misbehavior managing authority 74 via communication links 60, 62 through a communication network 18 (e.g., cellular. WiFi, etc.) The MBR may be transmitted directly to the misbehavior managing authority 74 (e.g., through communication link 64, 66). In other embodiments, the MBR may first be transmitted to a MBR pre-processing unit such as the OEM servers 70, 72 for pre-processing through communication links 64, 66. Then the pre-processed MBR may be transmitted from the MBR pre-processing servers 70, 72 to the misbehavior managing authority 74 through communication links 64, 66. In other embodiments, a MBR may be received from a vehicle, such as from vehicle 16, at the remote misbehavior managing authority 74. The remote misbehavior managing authority 74 may relay the received MBR from the vehicle 16 onto OEM servers 70, 72 via communication links 64, 66. In addition, the OEM servers 70, 72 may provide confirmation reports to the remote misbehavior managing authority 74 via communication links 64, 66.

Figure 2A:
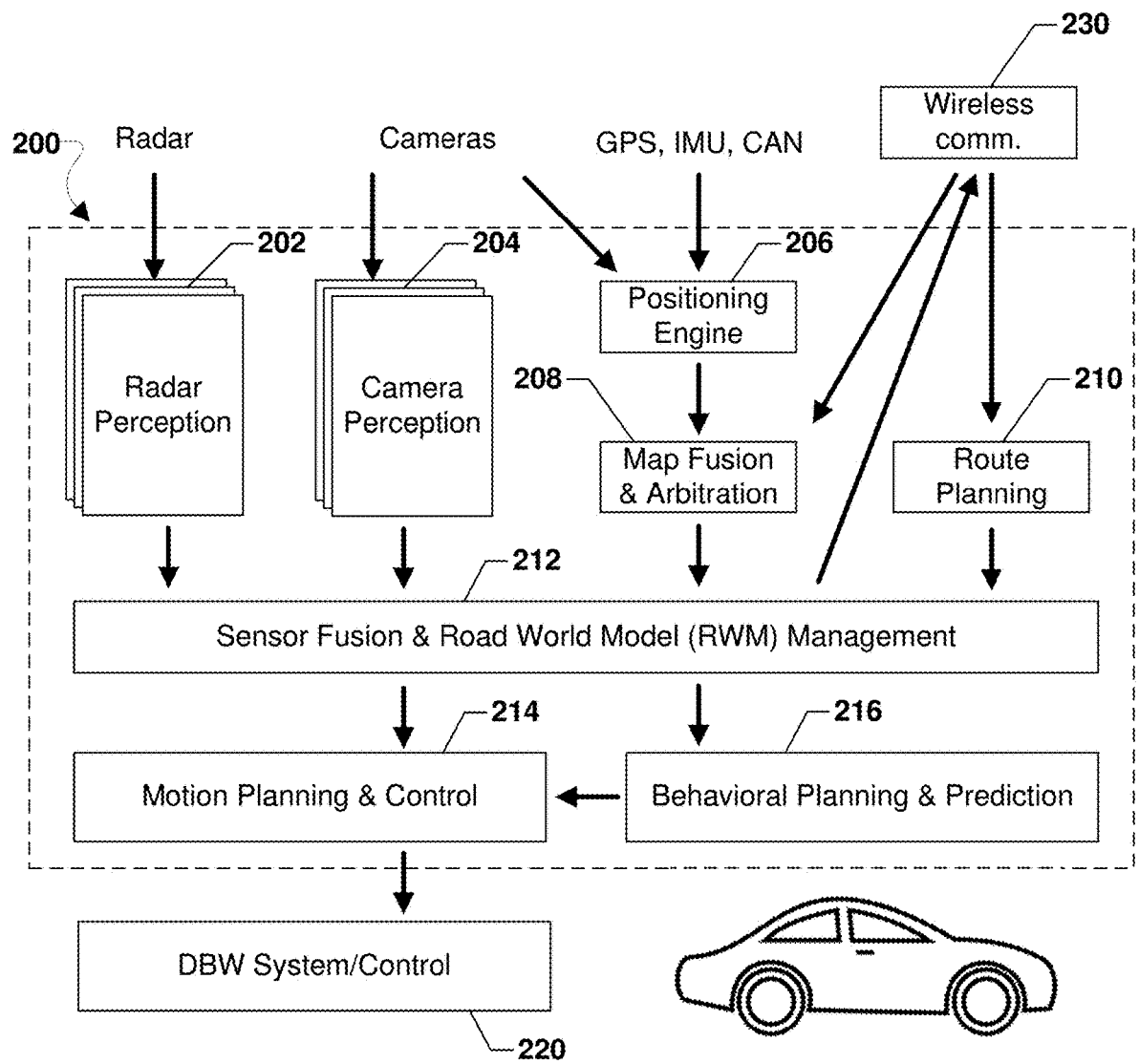
FIG. 2A is a component block diagram illustrating components of an example V2X system participant management system according to various embodiments.

FIG. 2A is a component block diagram illustrating components of an example vehicle processing system 200 of a vehicle 101 that may implement or be included within a V2X system. The vehicle processing system 200 may include various subsystems, communication elements, computational elements, processing devices or units that may be utilized within a vehicle 101. With reference to FIGS. 1A-2A, the various computational elements, computing devices or units within vehicle processing system 200 may be implemented within a system of interconnected computing devices (i.e., subsystems), that communicate data and commands to each other (e.g., indicated by the arrows in FIG. 2A). In some implementations, the various computational elements, processing devices or units within a vehicle processing system 200 may be implemented within a single processing device, such as separate threads, processes, algorithms or computational elements. Therefore, each subsystem/computational element illustrated in FIG. 2A is also generally referred to herein as "layer" within a computational "stack" that constitutes the vehicle processing system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle processing system stack may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle processing system stack 200. In other configurations, other layers may be included, such as additional layers for other perception sensors (e.g., LIDAR perception layer, etc.), additional layers for planning and/or control, additional layers for modeling, etc., and/or certain of the layers 202-216 may be excluded from the vehicle processing system stack 200. Each of the layers 202-216 may exchange data, computational results and commands as illustrated by the arrows in FIG. 2A. Further, the vehicle processing system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle processing system stack 200 may output vehicle control commands or signals to the drive by wire (DBW) system/control unit 220, which is a system, subsystem or computing device that interfaces directly with vehicle steering, throttle and brake controls. The configuration of the vehicle processing system stack 200 and DBW system/control unit 220 illustrated in FIG. 2A is merely an example configuration and other configurations of a vehicle management system and other vehicle components may be used. As an example, the configuration of the vehicle processing system stack 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 158, 160), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 158, 160) and/or any other available sensor, such as radars, LIDARs, etc.

The vehicle processing system 200 may include or be coupled to a vehicle wireless communication subsystem 230. The wireless communication subsystem 230 may be configured to communicate with other vehicle computing devices and highway communication systems, such as via vehicle-to-vehicle (V2V) communication links and/or to remote information sources, such as cloud-based resources, via cellular wireless communication systems, such as 5G networks. In various embodiments, the wireless communication subsystem 230 may communicate with other V2X system participants via wireless communication links to receive V2X messages as well as sensor data that may support a conclusion that a misbehavior condition is detected.

The map fusion and arbitration layer 208 may access sensor data received from other V2X system participants and receive output received from the positioning engine layer 206 and process the data to further determine the position of the vehicle 101 within the map, such as location within a lane of traffic, position within a street map, etc. sensor data may be stored in a memory (e.g., memory 312). For example, the map fusion and arbitration layer 208 may convert latitude and longitude information from GPS into locations within a surface map of roads contained in the sensor data. GPS position fixes include errors, so the map fusion and arbitration layer 208 may function to determine a best guess location of the vehicle within a roadway based upon an arbitration between the GPS coordinates and the sensor data. For example, while GPS coordinates may place the vehicle near the middle of a two-lane road in the sensor data, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize sensor data, as well as inputs from an operator or dispatcher to plan a route to be followed by the vehicle 101 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 101 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 101 to change speed, lane, direction of travel, or other navigational element(s), and combine that information with other received information to determine refined location and state information. The sensor fusion and RWM management layer 212 may output the refined location and state information of the vehicle 101, as well as refined location and state information of other vehicles and objects in the vicinity of the vehicle 100, to the motion planning and control layer 214, the behavior planning and prediction layer 216 and/or devices remote from the vehicle 101, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 101 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the LDM data and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 101. For example, based on route planning information, refined location in the roadway information, and relative locations and motions of other vehicles, the behavior planning and prediction layer 216 may determine that the vehicle 101 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 101 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the wireless communication subsystem 230 may communicate with other V2X system participants via wireless communication links to transmit sensor data, position data, vehicle data and data gathered about the environment around the vehicle by onboard sensors. Such information may be used by other V2X system participants to update stored sensor data for relay to other V2X system participants.

In various embodiments, the vehicle processing system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
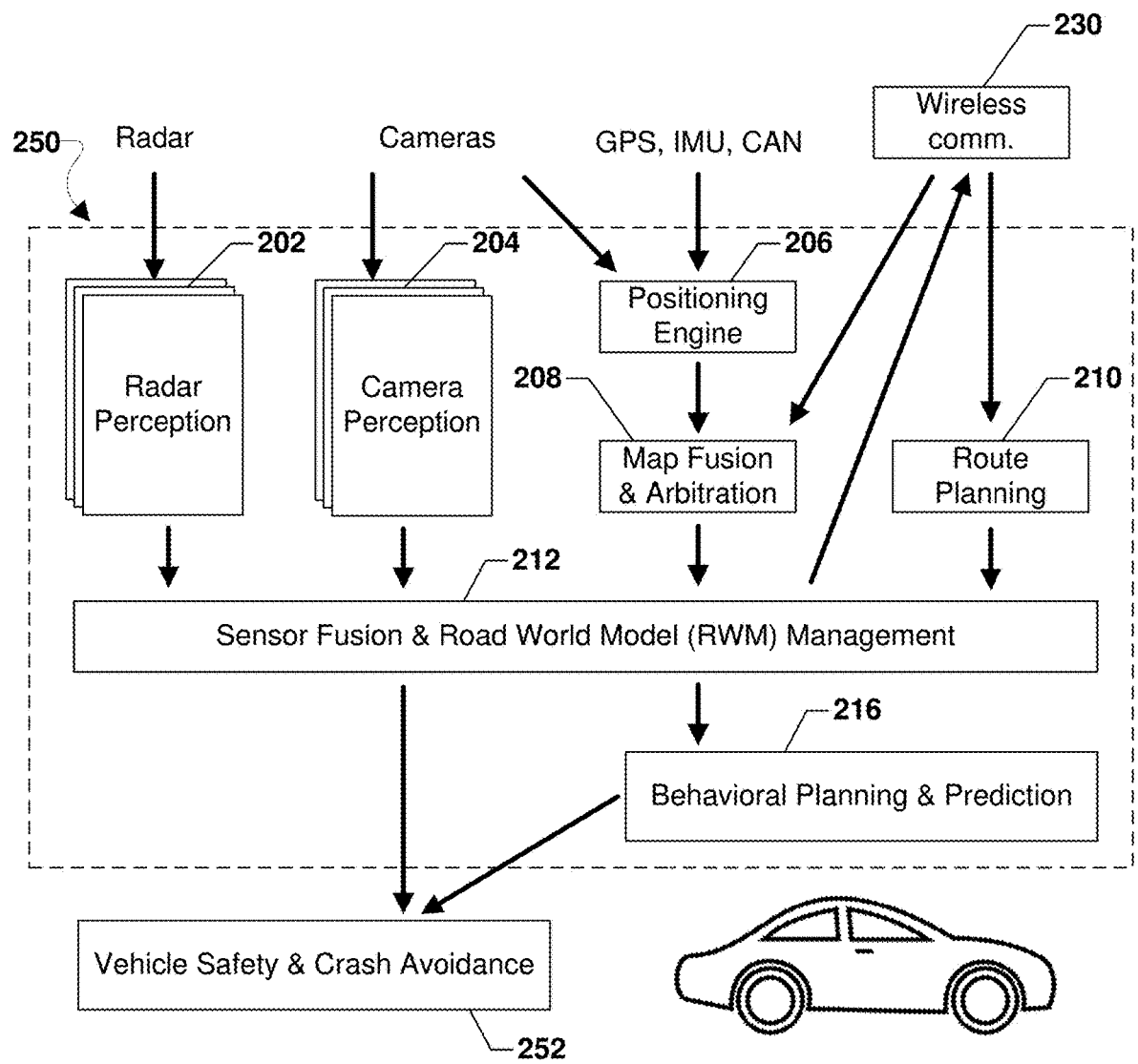
FIG. 2B is a component block diagram illustrating components of another example V2X system participant management system according to various embodiments

FIG. 2B illustrates an example of subsystems, computational elements, computing devices or units within a vehicle management system 250, which may be utilized within a vehicle 101. With reference to FIGS. 1A-2B, in some embodiments, the layers 202, 204, 206, 208, 210, 212, and 216 of the vehicle processing system stack 200 may be similar to those described with reference to FIG. 2A and the vehicle processing system stack 250 may operate similar to the vehicle processing system stack 200, except that the vehicle processing system stack 250 may pass various data or instructions to a vehicle safety and crash avoidance system 252 rather than the DBW system/control unit 220. For example, the configuration of the vehicle processing system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 101 provided to the vehicle safety and crash avoidance system 252. The vehicle safety and crash avoidance system 252 may use the refined location and state information of the vehicle 101 to make safety determinations relative to the vehicle 101 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 101 and/or occupants of the vehicle 101.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
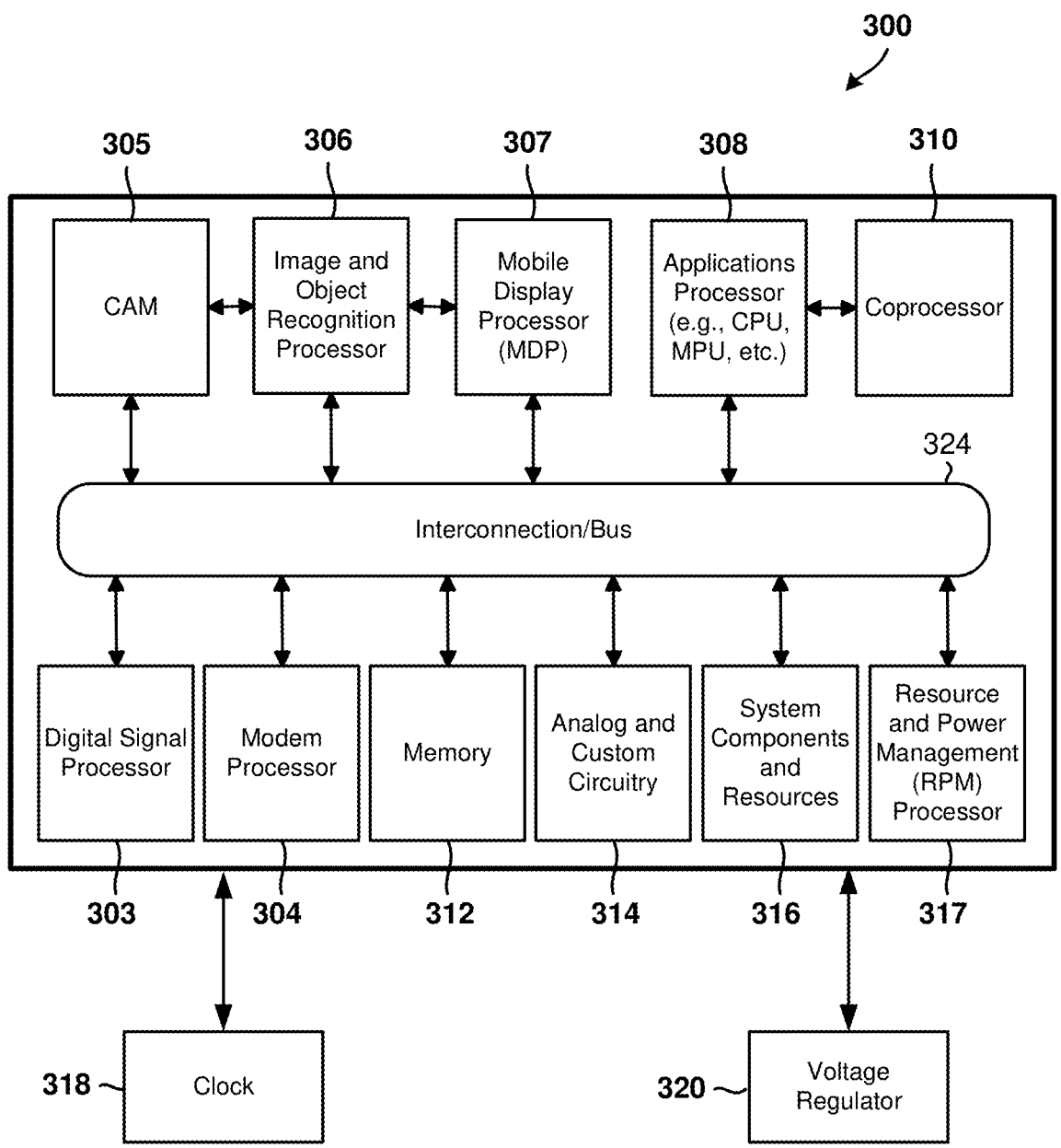
FIG. 3 is a block diagram illustrating components of a system on chip for use in a V2X system participant in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 158, 160 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 158, 160) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 158, 160, radar 168, lidar 170, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4A:
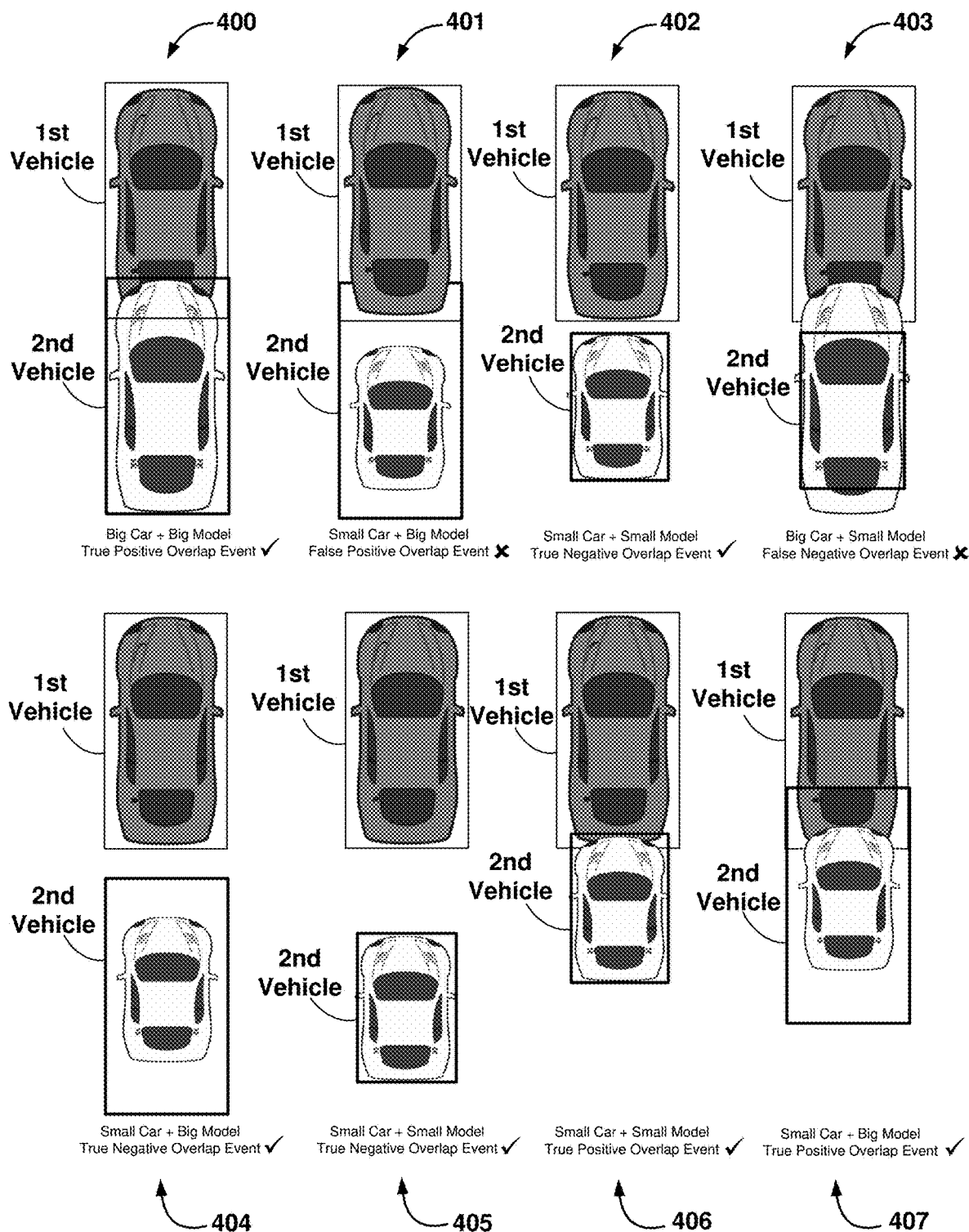
FIG. 4A illustrates a number of example scenarios that may occur when an accurate threshold vehicle model is chosen and an inaccurate threshold vehicle model is chosen.

In order to minimize the possible dimension values to calculate a possible position overlap misbehavior condition, a V2X system participant processor may assign threshold vehicle model data to a second vehicle. However, if the dimensional values do not accurately represent the second vehicle, the detection of a position overlap misbehavior condition may be a false positive condition. FIG. 4A illustrates a number of example scenarios that may occur when an accurate threshold vehicle model is chosen and an inaccurate threshold vehicle model is chosen and resulting conclusions from such selections. In each of the scenarios that are illustrated the first vehicle (e.g., reporting vehicle) is illustrated in the "top" position, the second vehicle (e.g., neighboring vehicle) is illustrated in the "bottom" position.

With reference to FIGS. 1A-4B, in each of scenarios 400-407, the first vehicle may use hardcoded default values for the first vehicle length and first vehicle length. In other embodiments, the first vehicle may assign first vehicle length and a first vehicle width based on a selected threshold vehicle model. In the example illustrated in scenario 400, the second vehicle may be a "big" vehicle that is assigned a "big" threshold vehicle model, and the reported positions of the first vehicle and the second vehicle, at least one of which is inaccurate, result in a position overlap. Thus, in scenario 400, a positive position overlap misbehavior condition has occurred (unless the second vehicle truly is partially within the trunk of the first vehicle, such as following a collision). The first vehicle and the second vehicle are determined to be positioned too close to one another and the first and second vehicles are assigned accurate dimensions from the selected threshold vehicle model set. Thus, the overlap misbehavior condition that has been detected may be a positive misbehavior event with a high confidence value the dimensional boundaries of the two vehicles overlap.

In the example illustrated in scenario 401, the second vehicle is a "small" vehicle that is inaccurately assigned a "big" threshold vehicle model. Thus, the second vehicle is assigned inaccurate dimensions from the selected threshold vehicle model set. Thus, in scenario 401, a false positive position overlap misbehavior condition may have occurred. Although the first vehicle and the second vehicle are properly positioned from one another to avoid a position overlap, the second vehicle is assigned inaccurate dimensions from a "big" threshold vehicle model. Thus, a position overlap misbehavior condition has been detected, but the detected position overlap misbehavior condition is a false positive event.

In the example illustrated in scenario 402, the second vehicle is a "small" vehicle that is accurately assigned a "small" threshold vehicle model. Thus, the second vehicle is assigned accurate dimensions from the selected threshold vehicle model set. Thus, in scenario 402, no position overlap is detected. In scenario 402, the first vehicle and the second vehicle are properly positioned from one another to avoid a position overlap, and the second vehicle is assigned accurate dimensions from a "small" threshold vehicle model. Thus, a position overlap misbehavior condition has not been detected, which is a true negative event.

In the example illustrated in scenario 403, the second vehicle may be a "big" vehicle that is inaccurately assigned a "small" threshold vehicle model. Thus, the second vehicle is assigned inaccurate dimensions from the selected threshold vehicle model set. Thus, in scenario 403, a false negative position overlap misbehavior condition may have occurred.

In scenario 403, the first vehicle and the second vehicle are improperly positioned relative to one another such that a position overlap would be detected if true dimensions were applied to both vehicles. However, since the second vehicle is assigned inaccurate dimensions from a "small" threshold vehicle model, a position overlap misbehavior condition has not been detected, which is a false negative event.

In the example illustrated in scenario 404, the second vehicle may be a "small" vehicle that is inaccurately assigned a "big" threshold vehicle model. Thus, the second vehicle is assigned inaccurate dimensions from the selected threshold vehicle model set. However, the vehicles are positioned sufficiently far apart such that there is no positional overlap, even though the bounding dimensions of the second vehicle are incorrect. Thus, in scenario 404, a true negative position overlap condition has occurred. In scenario 404, the first vehicle and the second vehicle are properly positioned from one another to avoid a position overlap, even though the second vehicle is assigned inaccurate dimensions from a "big" threshold vehicle model. Despite the inaccurate dimensions assigned to the "small" vehicle, a position overlap misbehavior condition has not been detected, and the non-detection of a position overlap condition is a true negative event.

In the example illustrated in scenario 405, the second vehicle is a "small" vehicle that is accurately assigned a "small" threshold vehicle model, and the second vehicle is assigned accurate dimensions from the selected threshold vehicle model set. Thus, in scenario 405, a true negative position overlap condition has occurred. In scenario 405, the first vehicle and the second vehicle are properly positioned from one another to avoid a position overlap, the second vehicle is assigned accurate dimensions from a "small" threshold vehicle model. Thus, a position overlap misbehavior condition has not been detected, the non-detection of a position overlap condition is a true negative event.

In the example illustrated in scenario 406, the second vehicle is a "small" vehicle that is accurately assigned a "small" threshold vehicle model. Thus, the second vehicle is assigned accurate dimensions from the selected threshold vehicle model set. Thus, in scenario 406, a true positive position overlap condition may have occurred. In scenario 406, the first vehicle and the second vehicle are improperly positioned from one another to result in a position overlap, the second vehicle is assigned accurate dimensions from a "small" threshold vehicle model. Thus, a position overlap misbehavior condition has been detected, the detection of a position overlap condition is a true positive event.

In the example illustrated in scenario 407, the second vehicle is a "small" vehicle that is inaccurately assigned a "big" threshold vehicle model. However, despite being assigned inaccurate and large dimensions, the second vehicle is in fact positioned too close to the first vehicle, resulting in a position overlap misbehavior condition. Thus, in scenario 407, a true positive position overlap condition may have occurred, because the first vehicle and the second vehicle are improperly positioned from one another, regardless that the second vehicle has assigned inaccurate dimensions from a "big" threshold vehicle model. Thus, despite the inaccurate dimension assignment, a position overlap misbehavior condition has been correctly detected, so the detection of a position overlap condition is a true positive event.

Figure 4B:
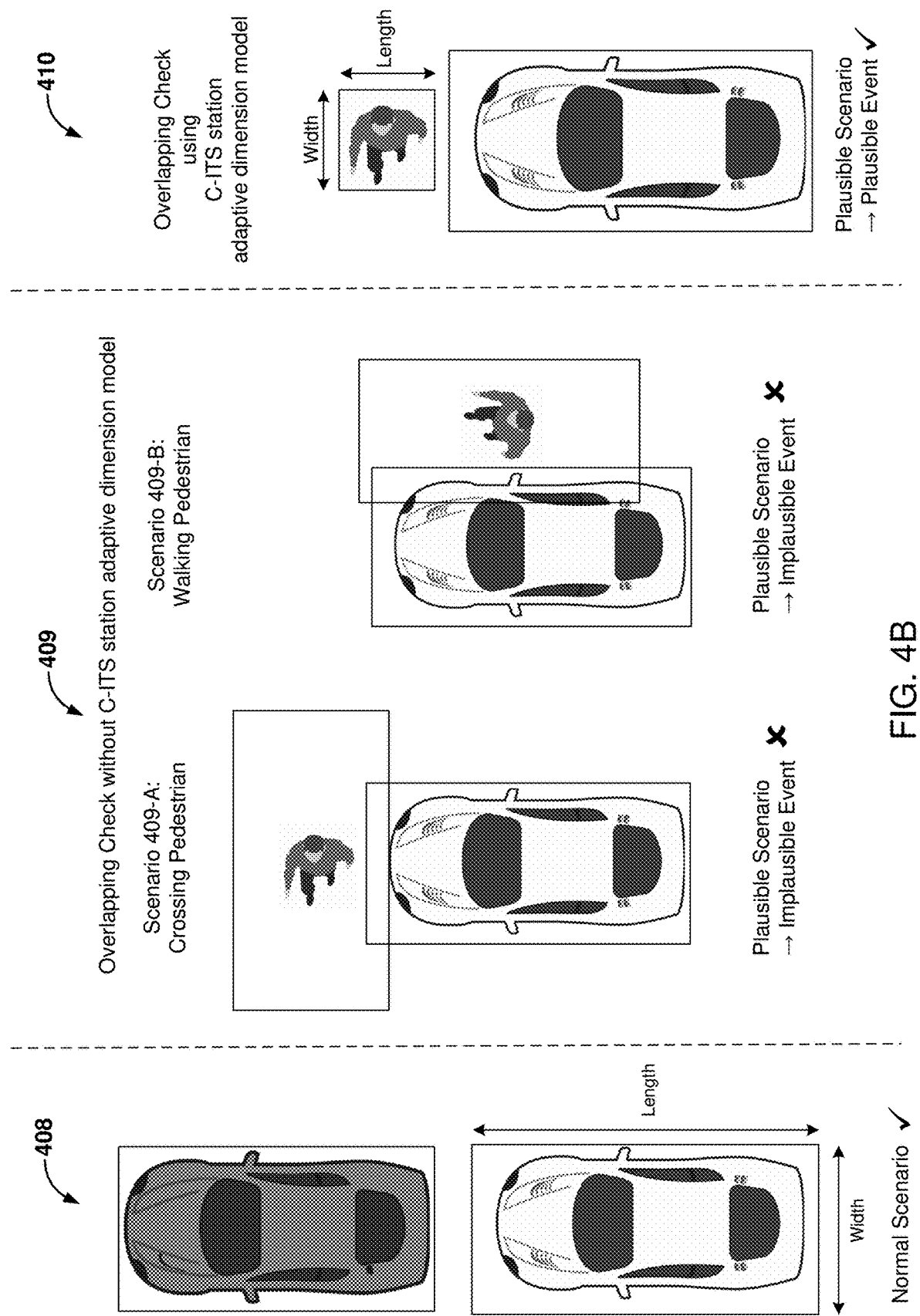
FIG. 4B illustrates additional examples of position overlap misbehavior condition detection anomalies that may occur when inaccurate dimensions are assigned to other V2X system participants, such as a pedestrian.

FIG. 4B illustrates additional examples of position overlap misbehavior condition detection anomalies that may occur when inaccurate dimensions are assigned to other V2X system participants, such as a pedestrian. In the example illustrated in scenario 408, a first vehicle and a second vehicle has been assigned accurate threshold vehicle models, and accordingly have been assigned accurate dimensions. Moreover, the first and second vehicles are properly positioned from one another to avoid a position overlap.

In the examples illustrated in scenarios 409 and 410, the other V2X entity may be a pedestrian with a mobile device capable of communicating through the V2X system. As a pedestrian, the entity may have actual dimensions shorter in length and narrower in width than that of the smallest car in a geographic area. Nevertheless, the pedestrian (i.e., second entity) may be considered a "small vehicle" and may be assigned a "vehicle" threshold model.

In scenarios 409-A and 409-B, the pedestrian has been inaccurately assigned a "big" threshold vehicle model. Thus, the pedestrian is assigned inaccurate dimensions from the selected threshold vehicle model set. Thus, in scenarios 409-A and 409, the vehicle may detect a false positive position overlap condition.

In scenario 410, the entity (i.e., the pedestrian) may have actual dimensions shorter in length and narrower in width than that of the smallest car in a geographic area. In some instances, the pedestrian may be considered a "small vehicle" that is accurately assigned a "small" threshold vehicle model. In scenario 410, the pedestrian is assigned accurate dimensions from the selected threshold vehicle model set. Thus, in scenario 410, the vehicle may detect a true negative position overlap condition. The first vehicle and the pedestrian are properly positioned from one another to avoid a position overlap. In addition, since the pedestrian (being treated as a "second vehicle") has been assigned accurate dimensions from a "small" threshold vehicle model, the vehicle processor does not detect a position overlap misbehavior condition has occurred. Since a position overlap misbehavior condition has not been detected, the non-detection of the position overlap condition is a true negative event.

Figure 4C:
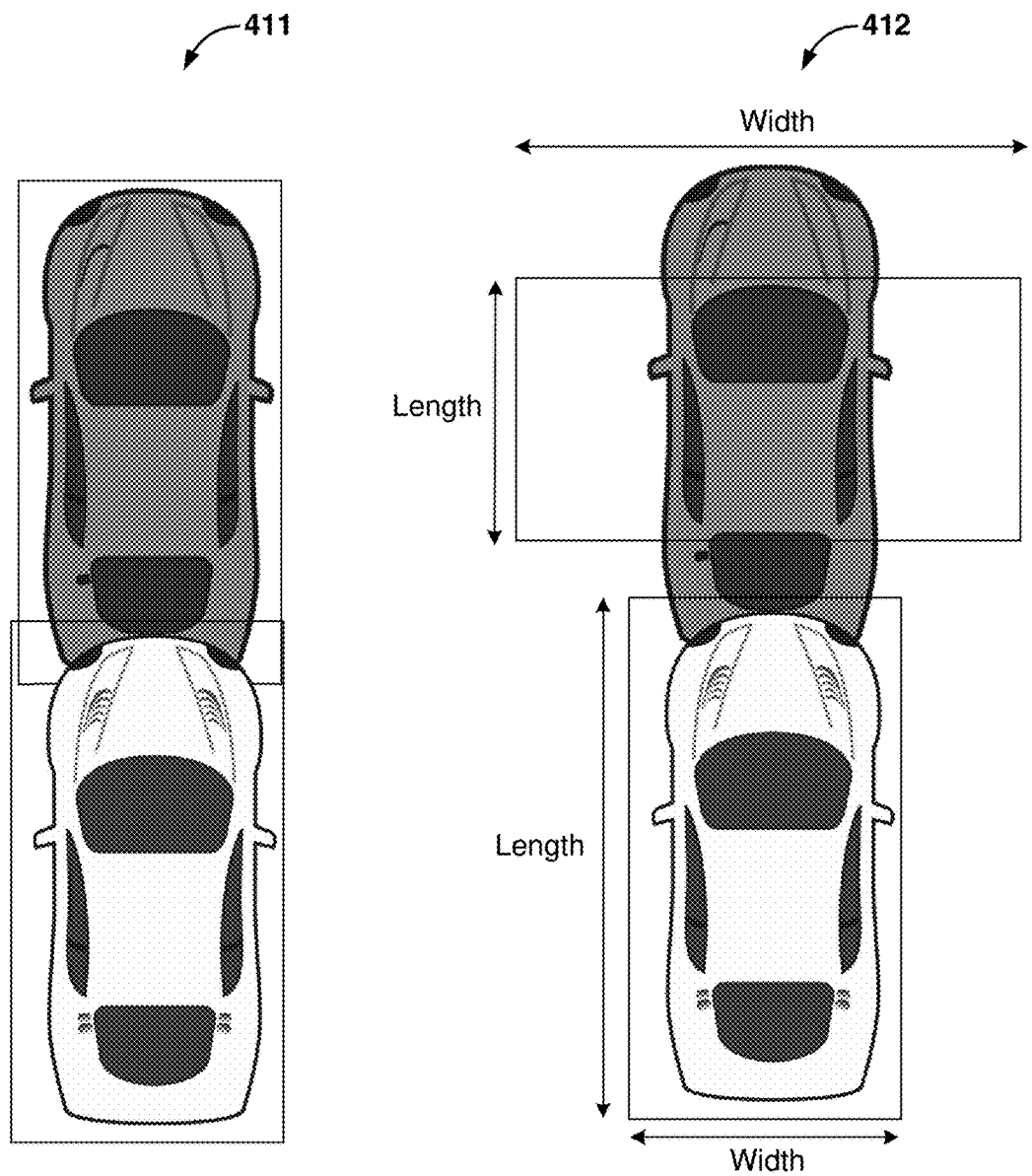
FIG. 4C illustrates additional examples of position overlap misbehavior condition detection anomalies when position reports indicated overlap depending on reported vehicle dimensions.

FIG. 4C illustrates additional examples of position overlap misbehavior condition detection anomalies that may occur when inaccurate dimensions are assigned to other V2X system participants. With reference to FIGS. 1-4C, in the example illustrated in scenario 411, similar to scenario 400, the second vehicle may be a "big" vehicle that is accurately assigned a "big" threshold vehicle model. Thus, the second vehicle is assigned accurate dimensions from the selected threshold vehicle model set. In contrast, in scenario 412, the first vehicle has been assigned dimensions that are unreliable. In scenario 412, the first vehicle has been assigned a width that is larger than the assigned length. Thus, even though the first vehicle and the second vehicle are positioned such that their positions overlap, the second vehicle does not detect the position overlap condition, because the dimensions assigned to the first vehicle are incorrect (i.e., are unreliable).

The various scenarios shown in FIGS. 4A-4C illustrate a need to accurately represent the dimensions of the vehicles in a V2X system. One solution to this need may be to store each individual set of dimensions for each model and variant of a vehicle known to the V2X system; however, such a solution may not be efficient or practicable in a V2X system with limited resources. Further, the scenarios illustrated in FIGS. 4A-4C demonstrate using unreliable V2X information can lead to the detection of false positives and false negatives that can cause a vehicle to make maneuvering decisions that do not match reality. Such false positive and false negative event occurrences may cause injury to lives and property, may cause distrust of the V2X system, and defeat the purpose of intelligent transport systems (ITS).

Figure 5A:
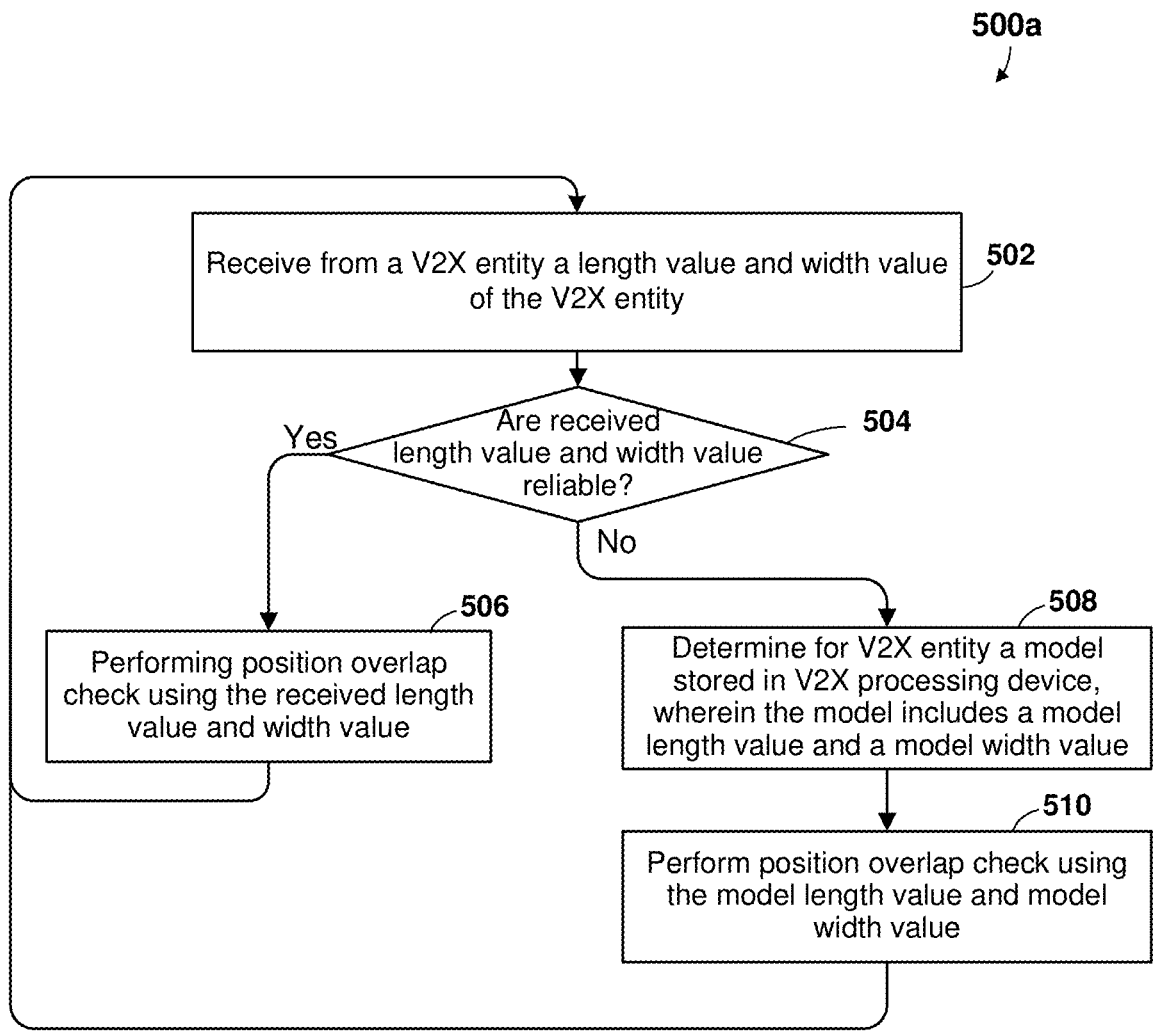
FIG. 5A is a process flow diagram illustrating an example method for evaluating V2X information in accordance with various embodiments.

FIG. 5A is a process flow diagram of an example method 500a for evaluating V2X information in accordance with various embodiments. With reference to FIGS. 1-5A, the operations of the method 500a may be performed by a vehicle-to-every thing (V2X) processing device that includes hardware, software, or a combination of hardware and software components, such as those illustrated in FIGS. 1C, 2A, 2B, 3, 6, 7, and 8. For example, means for performing the operations of the method 500a may include a vehicle-to-everything (V2X) processing device (such as the processor 140a, the vehicle processing system 200, the vehicle management system 250, or any of the processors 303, 304, 306, 307, 308, and 310).

In block 502, the V2X processing device may receive from a V2X entity a length value and a width value of the V2X entity. Such information may be received in a Basic Safety Message or other V2X message.

In determination block 504, the V2X processing device may determine whether the received length value and width value are reliable. In some embodiments, the V2X processing device may determine whether the width value is less than or equal to the length value, and determine that the dimension values are not reliable in response to determining that the received width value exceeds the received length value.

In response to determining that the received length value and width value are reliable (i.e., determination block 504="Yes"), the V2X processing device may perform a position overlap check using the received length value and width value in block 506.

In response to determining that the received length value and width value are not reliable (i.e., determination block 504="No"), the V2X processing device may determine for the V2X entity a model stored in the V2X processing device in block 508. In some embodiments, the model may include a model length value and a model with value.

In block 510, the V2X processing device may perform the position overlap check using the model length value and the model with value.

Following the performance of the operations of block 506 or block 510, the processor may again perform the operations of block 502 to receive another set of length and width values for a V2X entity. In some embodiments, the V2X processing device may iteratively perform the operations of blocks 502-510 from time to time. In this manner, the V2X processing device may monitor vehicle overlap conditions including determining the reliability of the length value and the width value in the received V2X information.

FIG. 5B-5H are process flow diagrams of example operations 500b-500h that may be performed as part of the method 500a for evaluating V2X information in accordance with various embodiments. With reference to FIGS. 1-5H, the operations 500b-500h may be performed by a vehicle-to-everything (V2X) processing device that includes hardware, software, or a combination of hardware and software components, such as those illustrated in FIGS. 1C, 2A, 2B, 3, 6, 7, and 8. For example, means for performing the operations of the method 500a may include a vehicle-to-everything (V2X) processing device (such as the processor 140a, the vehicle processing system 200, the vehicle management system 250, or any of the processors 303, 304, 306, 307, 308, and 310).

Figure 5B:
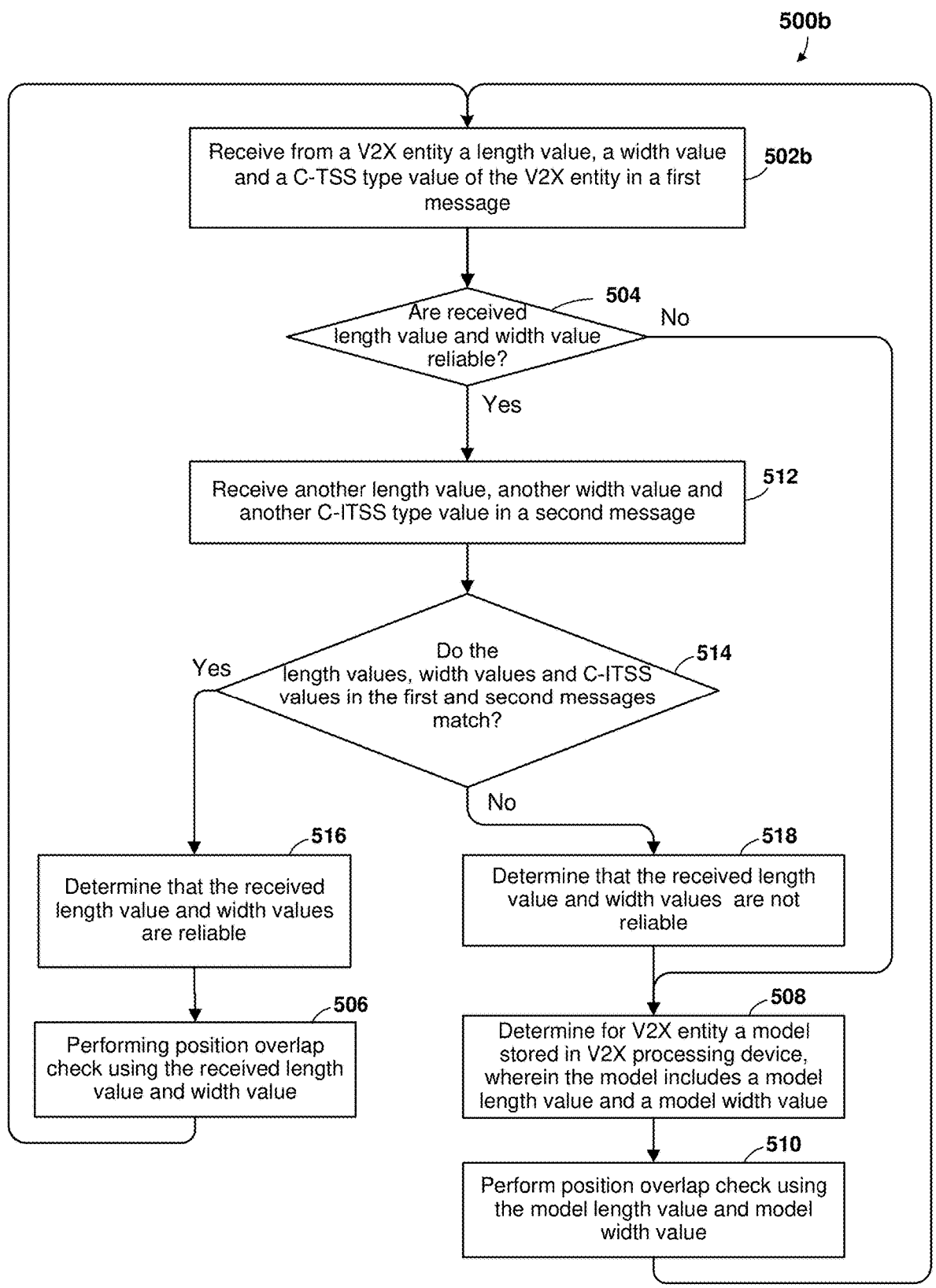
FIGS. 5B-5H are process flow diagrams illustrating example operations that may be performed as part of the method for evaluating V2X information in accordance with various embodiments.

Referring to FIG. 5b, in the method 500b, reliability of V2X entity dimensions may be determined based in part on whether the dimensions vary from time to time as most entities will be of set lengths and widths.

In block 502b of the method 500b, the V2X processing device may receive a length value, a width value and a cooperative Intelligent Transportation System service (C-ITSS) type value in a first message from a V2X entity. In determination block 504, the V2X processing device may determine whether the length value and the width value are reliable as describe in the method 500a.

In response to determining that the length value and the width value are reliable (i.e., determination block 504="Yes"), the V2X processing device may receive from the V2X entity in a second message another length value, another width value, and another C-ITSS type value of the V2X entity in block 512.

In determination block 514, the V2X processing device may determine whether the length values, width values, and C-ITSS type values received in the first and second messages match. As the length, width and C-ITSS type values should remain constant, a change in any of these values from one message to another may indicate that the dimensional information is not reliable.

In response to determining that the length values, width values, and C-ITSS type values received in the first and second messages match (i.e., determination block 514="Yes"), the V2X processing device may determine that the length values and width values are reliable in block 516, and perform a position overlap check using the received length value and width value in block 506 as described.

In response to determining that one or more of the length values, width values, or C-ITSS type values received in the first and second messages do not match (i.e., determination block 514="No"), the V2X processing device may determine that the length values and width values are not reliable in block 518, and perform the operations in blocks 508 and 510 of the method 500a as described.

Figure 5C:
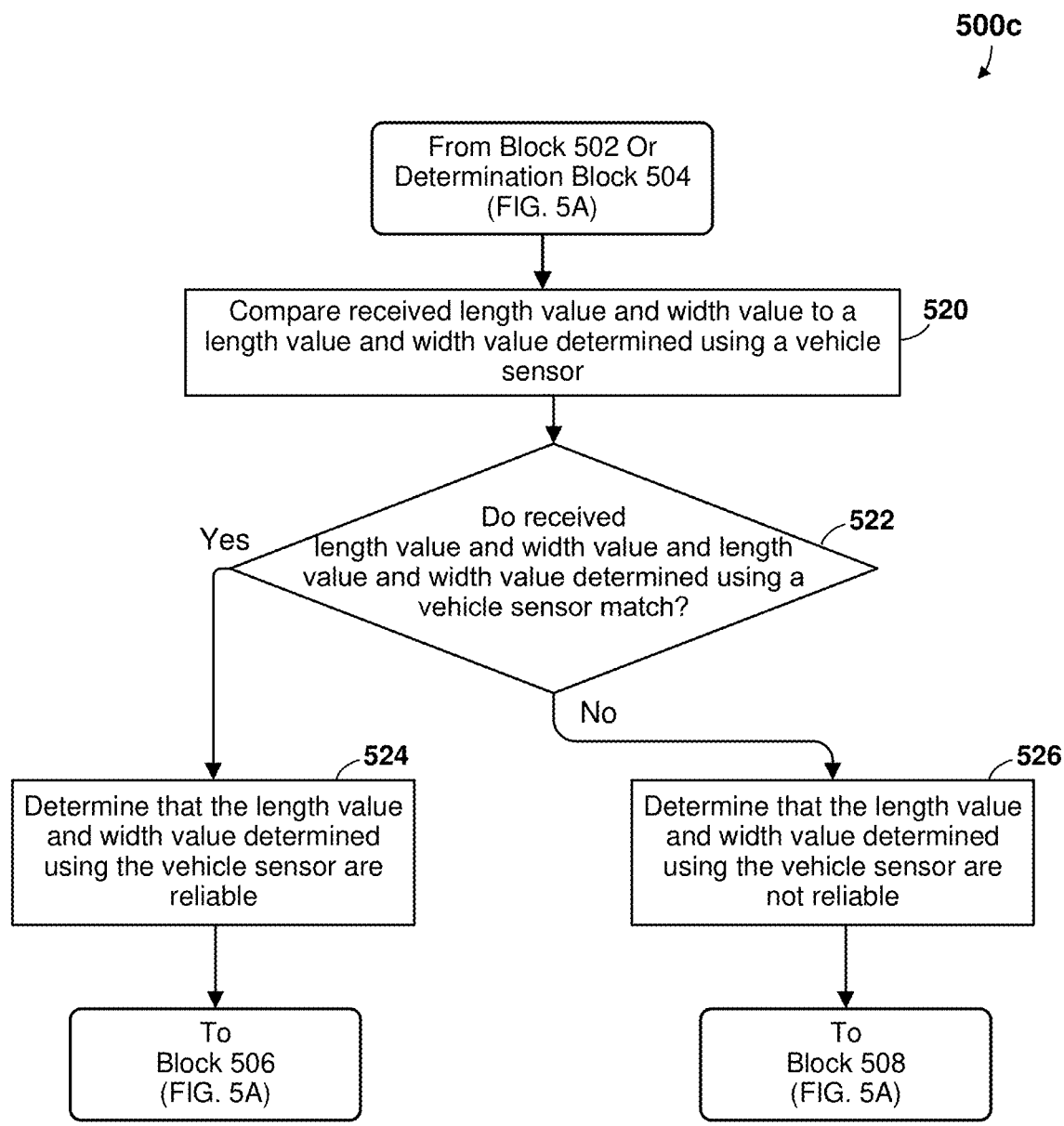

Referring to FIG. 5C, in the method 500c, after performing the operations of determination block 504="Yes" or block 508 of the method 500a (FIG. 5A), the V2X processing device may compare the received length value and width value to a length value and width value determined using a vehicle sensor in block 520.

In determination block 522, the V2X processing device may determine whether the received length value and width value match the length value and width value determined using a vehicle sensor.

In response to determining that the received length value and width value match the length value and width value determined using a vehicle sensor (i.e., determination block 522="Yes"), the V2X processing device may determine that the length value and width value determined using the vehicle sensor are reliable in block 524.

In response to determining that the received length value and width value do not match the length value and width value determined using a vehicle sensor (i.e., determination block 522="No"), the V2X processing device may determine that the length value and width value determined using the vehicle sensor are not reliable in block 526.

Following the operations of block 524 or block 526, the V2X processing device may perform operations in block 506 or block 508 of the method 500a to perform a position overlap check as described.

Figure 5D:
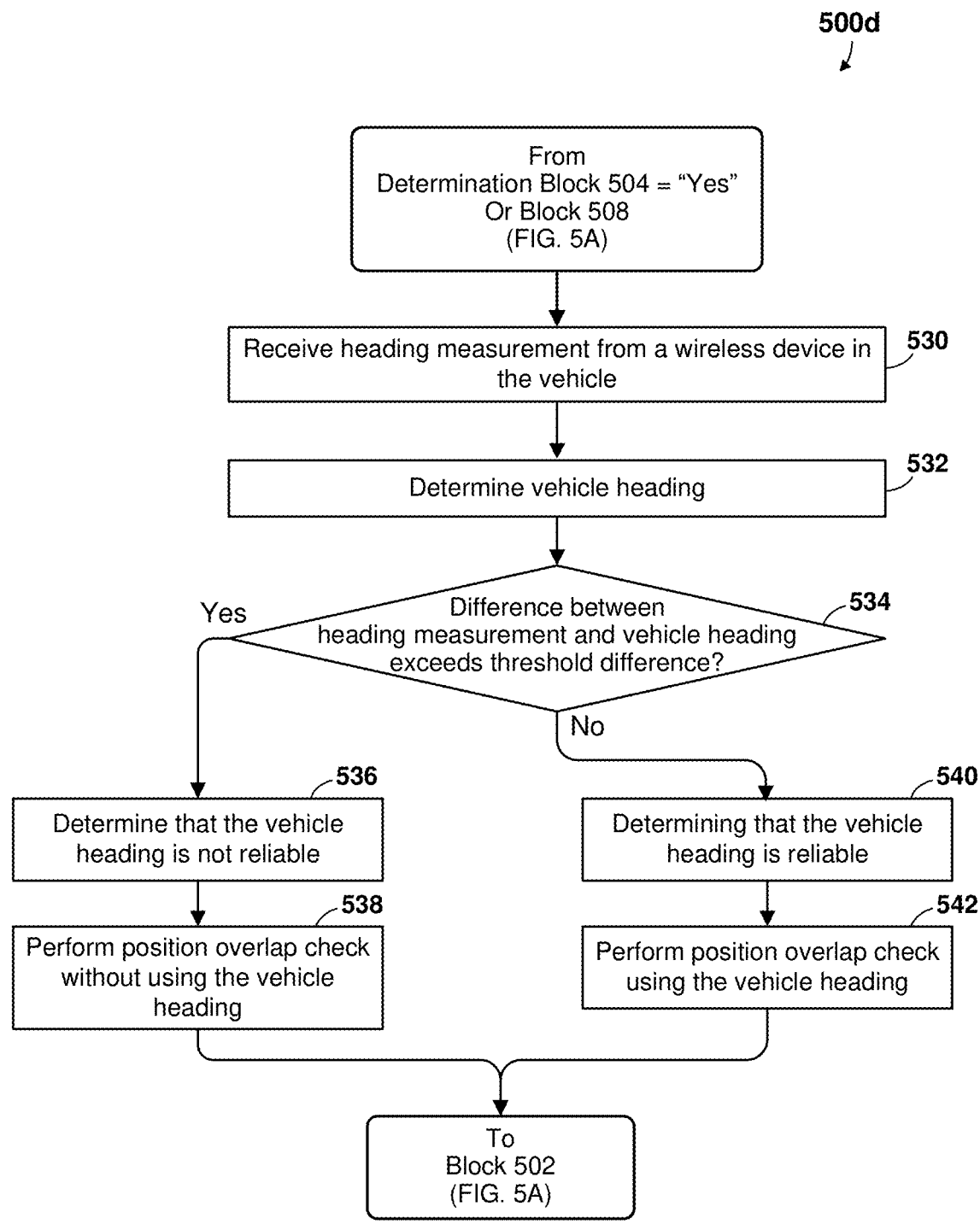

Referring to FIG. 5D, in the method 500d, after performing the operations of determination block 504="Yes" or block 508 of the method 500a, the V2X processing device may receive a heading measurement from a wireless device in the vehicle in block 530.

In block 532, the V2X processing device may determine a vehicle heading. For example, the V2X processing device may obtain or receive a heading of the vehicle from a vehicle location device or function.

In determination block 534, the V2X processing device may determine whether a difference between the heading measurement and a vehicle heading exceeds a threshold difference. For example, referring to FIG. 5G, the V2X processing device may subtract the heading measurement from the vehicle heading (or vice versa) to determine an angular difference 570 between the heading measurement and a vehicle heading. In some embodiments, the V2X processing device may compare the difference between the vehicle heading and the heading measurement 570 to a difference threshold 572 (e.g., a maximum number of degrees or radians in angular difference).

In response to determining that the difference between the heading measurement and a vehicle heading exceeds the difference threshold (i.e., determination block 534="Yes"), the V2X processing device may determine that the vehicle heading is not reliable in block 536.

In block 538, the V2X processing device may perform a position overlap check without using the vehicle heading, using other measurements or values, such as the V2X entity length and width values received in block 502.

In response to determining that the difference between the heading measurement and a vehicle heading does not exceed the threshold difference (i.e., determination block 534="No"), the V2X processing device may determine that the vehicle heading is reliable in block 540.

In block 542, the V2X processing device may use the vehicle heading to perform a position overlap check using the vehicle heading. In some embodiments, the V2X processing device may include the vehicle heading along with other value(s) or measurement(s) to perform the position overlap check.

After performing operations of block 538 or block 542, the V2X processing device may perform the operations of block 502 of the method 500a to receive further V2X length and width values as described.

Figure 5E:
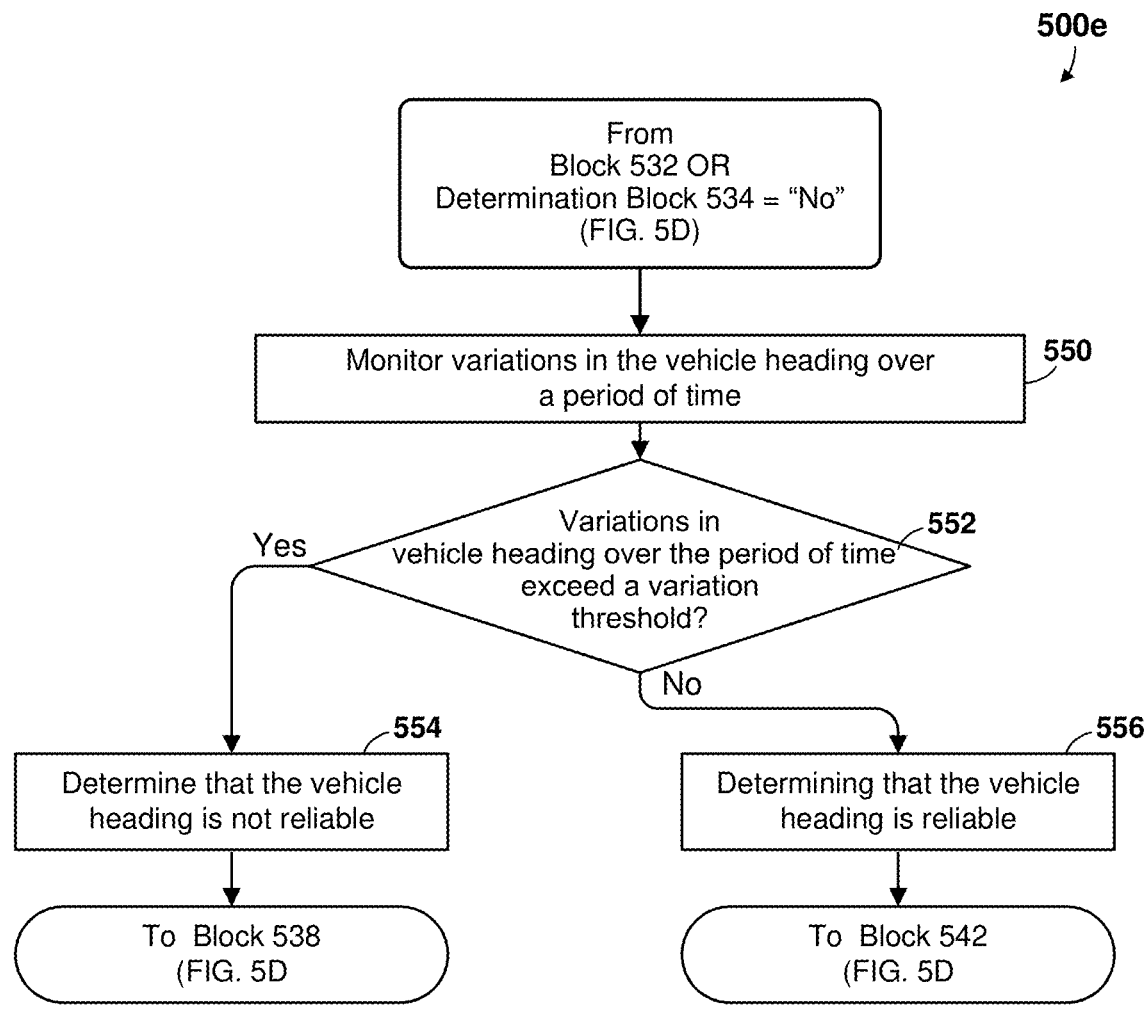

Referring to FIG. 5E, in some embodiments, the V2X processing device may perform operations of the method 500e instead of or in parallel with the operations of determination block 534 and blocks 536 and 540 of the method 500d (FIG. 5D) to determine the reliability of vehicle heading information based on observed variability in vehicle heading measurements.

In block 550 of the method 500e, the V2X processing device may monitor variations in the vehicle heading measurements received over a period of time in block in block 550 of the method 500d. For example, each time a heading measurement is received, the V2X processing device may compare the received heading measurement to prior heading measurements and/or determine statistics related to variability in heading measurements, such as determining a variation in heading angle from a running average heading or standard deviation of heading measurements about a running average heading.

In determination block 552, the V2X processing device may determine whether variations in the vehicle heading observed over the period of time exceed a variation threshold. For example, referring to FIG. 5H, the V2X processing device may determine whether a vehicle heading 580 (or heading measurement) exhibits a variation 582 from a running average by more than a variation threshold 584 (e.g., a maximum number of degrees or radians in angular difference).

Returning to FIG. 5E, in response to determining that the variations in the vehicle heading over the period of time exceed the variation threshold (i.e., determination block 552="Yes"), the V2X processing device may determine that the vehicle heading is not reliable in block 554, and perform the operations of block 538 of the method 500d as described.

In response to determining that the variations in the vehicle heading over the period of time do not exceed the variation threshold (i.e., determination block 552="No"), the V2X processing device may determine that the vehicle heading is reliable in block 556, and then perform the operations of block 542 of the method 500d as described.

Figure 5F:
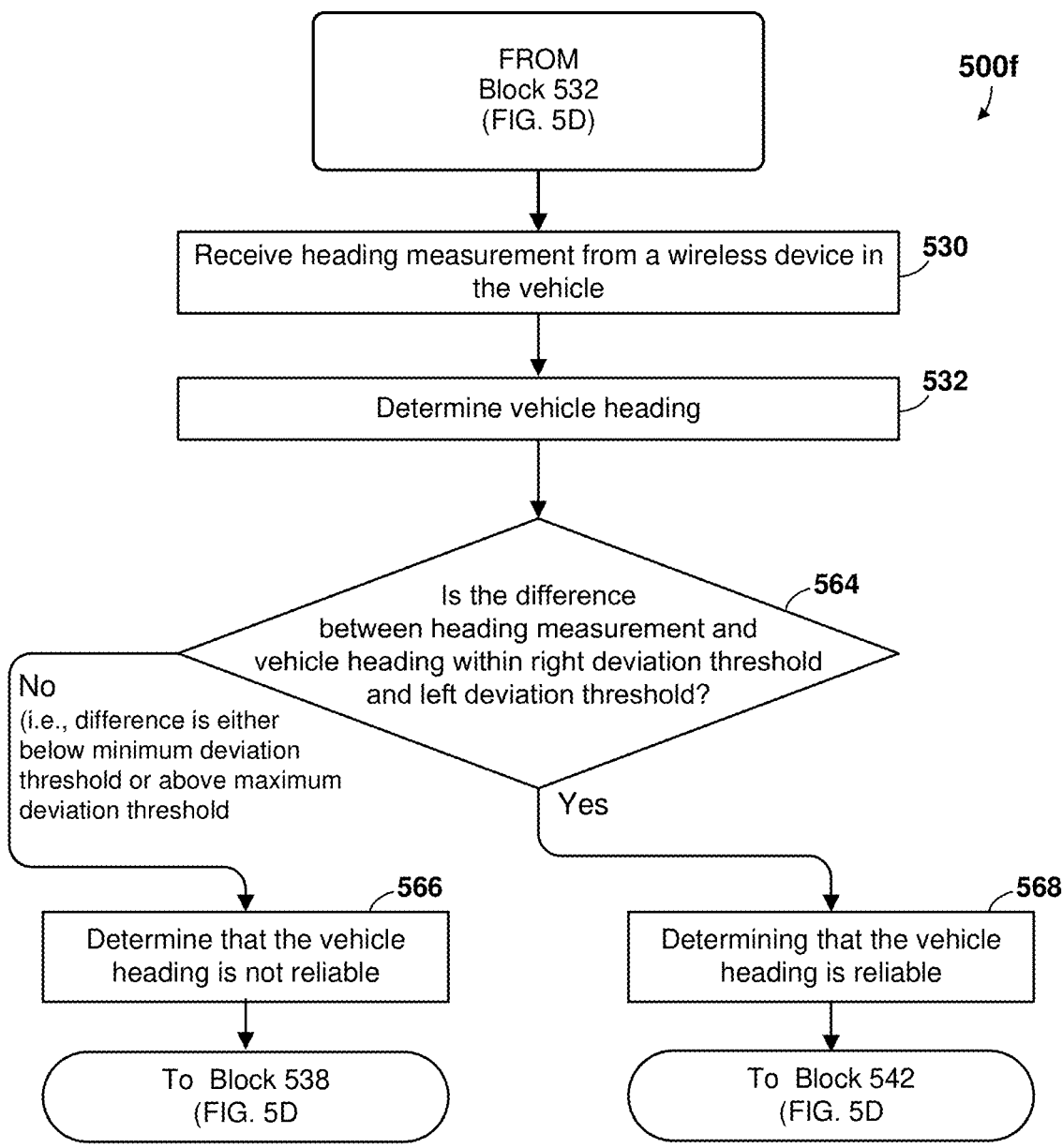
Figure 5G:
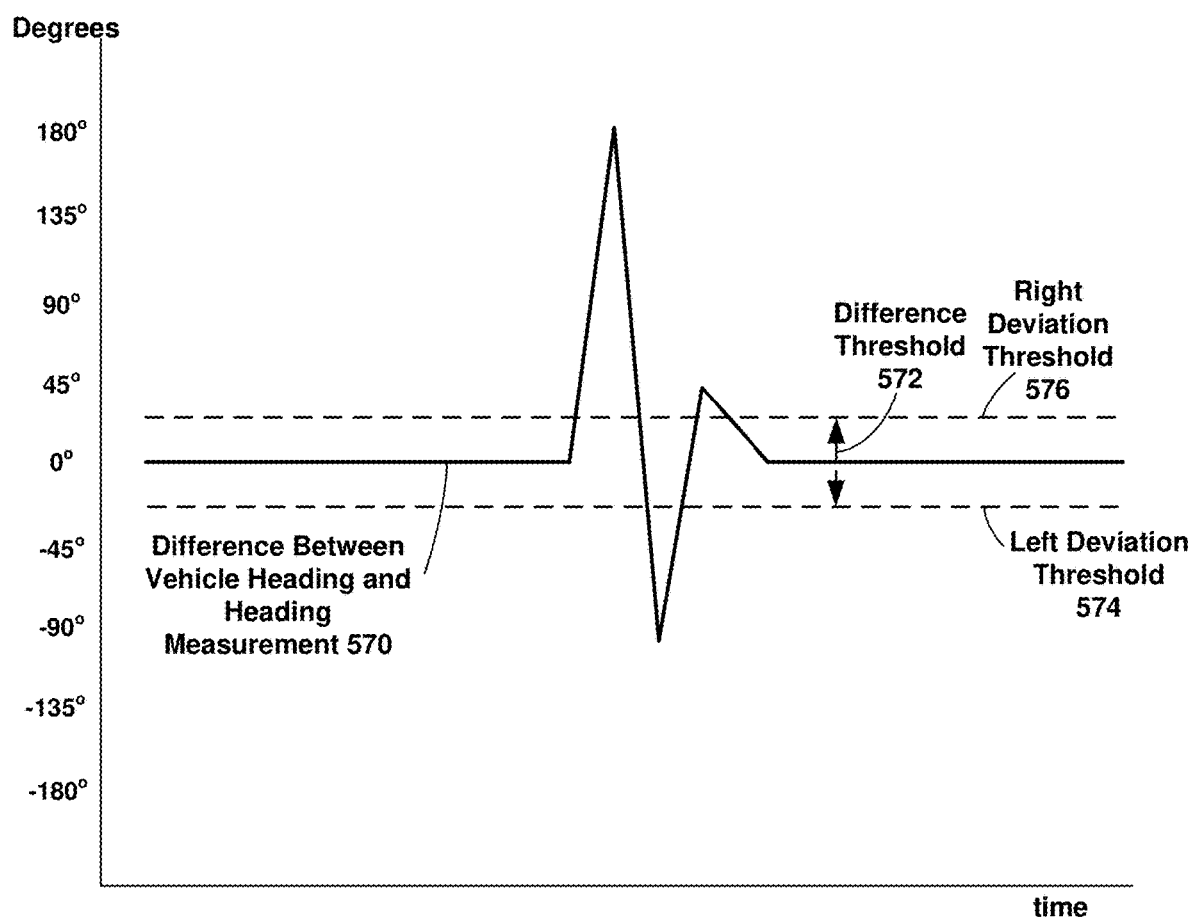
Figure 5H:
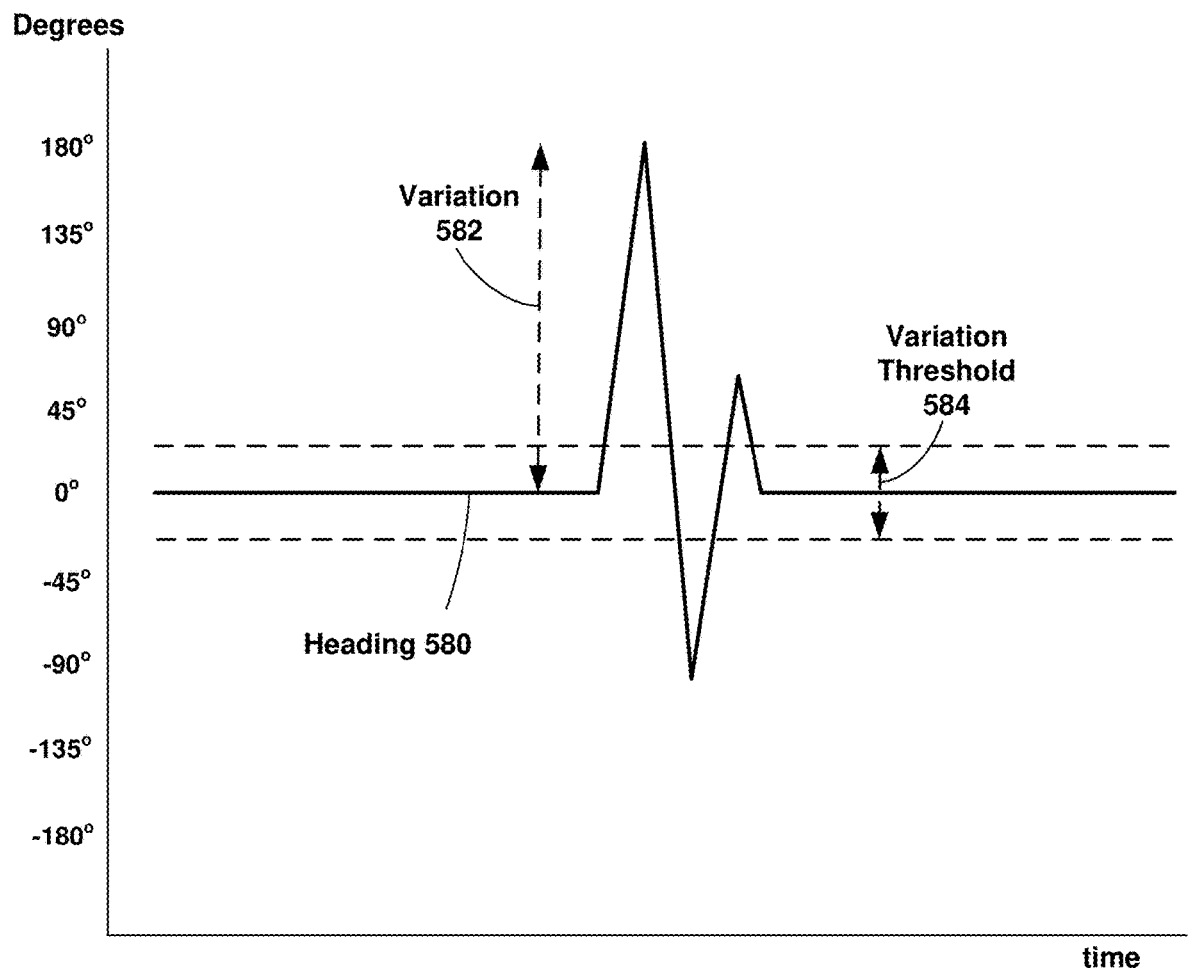

Referring to FIG. 5F, in some embodiments, following performance of the operations of blocks 530 and 532 of the method 500d, the V2X processing device may perform the method 500f to determine whether the difference between a heading measurement and the vehicle heading is within an angular difference between a left deviation threshold and a right deviation threshold in determination block 564. For example, referring to FIG. 5G, the V2X processing device may subtract the heading measurement from the vehicle heading (or vice versa) to determine an angular difference 570 between the heading measurement and a vehicle heading, and compare the angular difference to a left deviation threshold 574 and a right deviation threshold 576. In some embodiments, the left deviation threshold 574 and the right deviation threshold 576 may be an equal number of degrees or radian. In some embodiments, the left deviation threshold 574 and the right deviation threshold 576 may not be equal, such as to account for a known bias in one or both of the vehicle heading values or the heading measurements.

In response to determining that the difference between the heading measurement and the vehicle heading exceeds either the left deviation threshold 574 and the right deviation threshold 576 (i.e., determination block 564="No"), the V2X processing device may determine that the vehicle heading is not reliable in block 566, and perform the operations of block 538 as described.

In response to determining that the difference between the heading measurement and the vehicle heading is within or between the left deviation threshold 574 and the right deviation threshold 576 (i.e., determination block 564="Yes"), the V2X processing device may determine that the vehicle heading is reliable in block 568, and perform the operations of block 542 as described.

Figure 6:
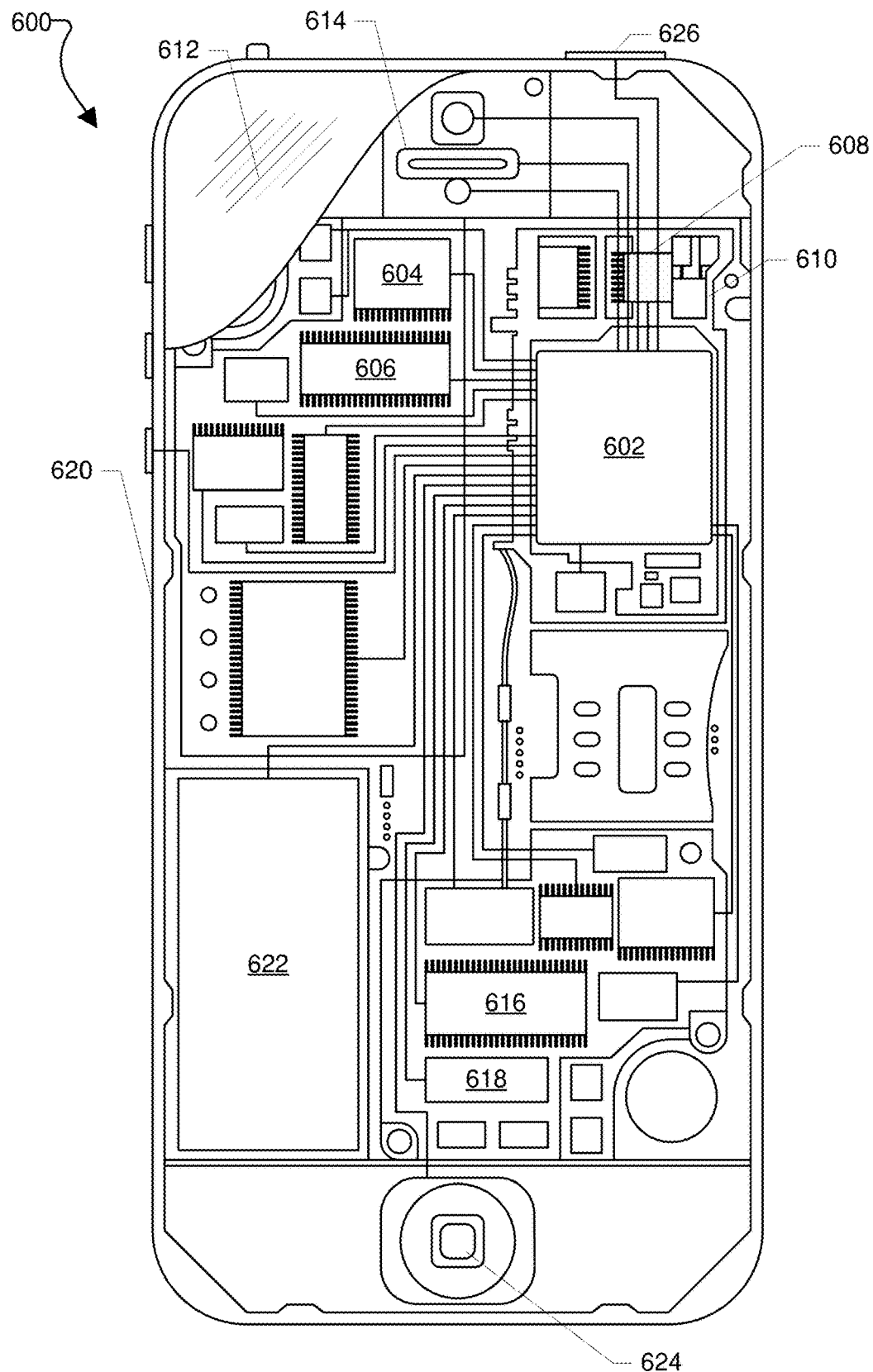
FIG. 6 is a component block diagram illustrating an example mobile computing device suitable for use with the various embodiments.

Various embodiments (including, but not limited to, embodiments described above with reference to FIGS. 1A-5H) may be implemented in a wide variety of computing systems including on-board equipment as well as mobile computing devices, an example of which suitable for use with the various embodiments is illustrated in FIG. 6. The mobile computing device 600 may include a processor 602 coupled to a touchscreen controller 604 and an internal memory 606. The processor 602 may be one or more multicore integrated circuits designated for general or specific processing tasks. The internal memory 606 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the mobile computing device 600 need not have touch screen capability.

The mobile computing device 600 may have one or more radio signal transceivers 608 (e.g., Peanut, Bluetooth, ZigBee, Wi-Fi, RF radio) and antennae 610, for sending and receiving communications, coupled to each other and/or to the processor 602. The transceivers 608 and antennae 610 may be used with the above-mentioned circuitry to implement the various wireless transmission protocol stacks and interfaces. The mobile computing device 600 may include a cellular network wireless modem chip 616 that enables communication via a cellular network and is coupled to the processor.

The mobile computing device 600 may include a peripheral device connection interface 618 coupled to the processor 602. The peripheral device connection interface 618 may be singularly configured to accept one type of connection, or may be configured to accept various types of physical and communication connections, common or proprietary, such as Universal Serial Bus (USB), FireWire, Thunderbolt, or PCIe. The peripheral device connection interface 618 may also be coupled to a similarly configured peripheral device connection port (not shown).

The mobile computing device 600 may also include speakers 614 for providing audio outputs. The mobile computing device 600 may also include a housing 620, constructed of a plastic, metal, or a combination of materials, for containing all or some of the components described herein. One of ordinary skill in the art may recognize that the housing 620 may be a dashboard console of a vehicle in an on-board embodiment. The mobile computing device 600 may include a power source 622 coupled to the processor 602, such as a disposable or rechargeable battery. The rechargeable battery may also be coupled to the peripheral device connection port to receive a charging current from a source external to the mobile computing device 600. The mobile computing device 600 may also include a physical button 624 for receiving user inputs. The mobile computing device 600 may also include a power button 626 for turning the mobile computing device 600 on and off.

Figure 7:
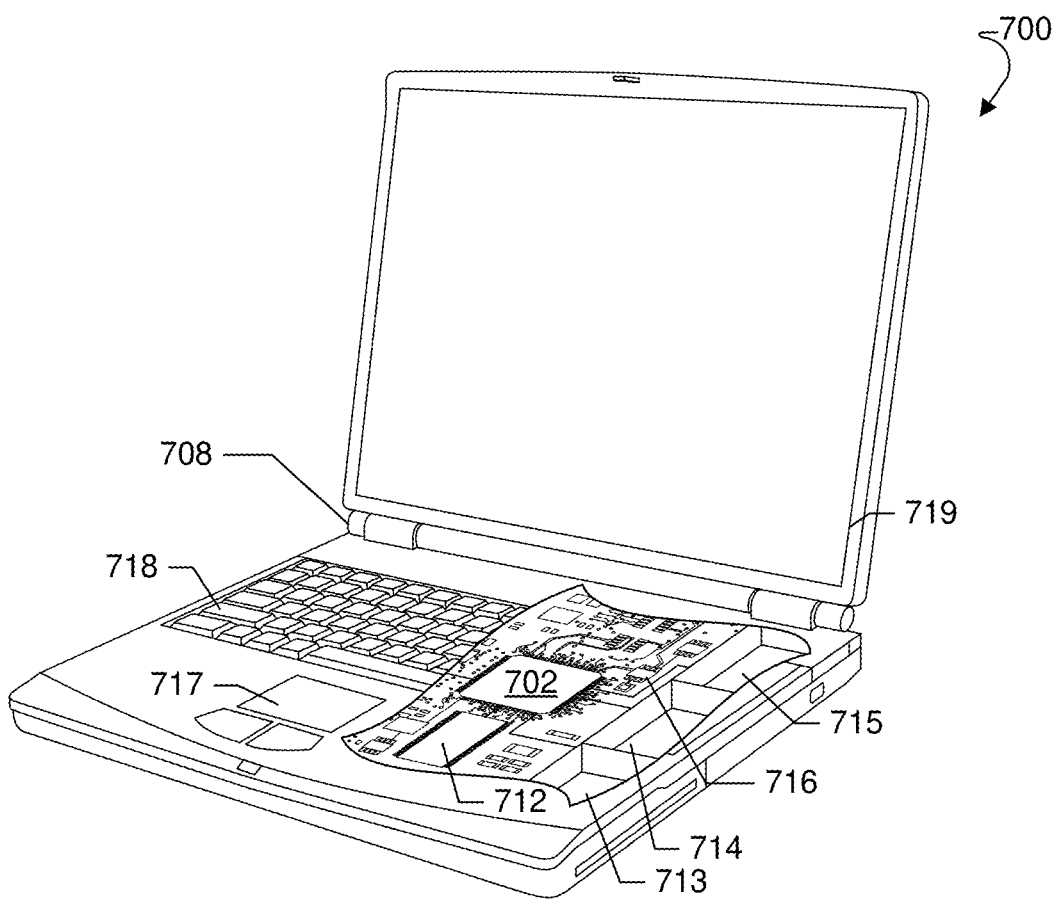
FIG. 7 is a component block diagram illustrating an example mobile computing device suitable for use with the various embodiments.

Various embodiments (including, but not limited to, embodiments described above with reference to FIGS. 1A-6) may be implemented in a wide variety of computing systems include a laptop computer 700 an example of which is illustrated in FIG. 7. Many laptop computers include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 70) may also include a floppy disc drive 714 and a compact disc (CD) drive 715 coupled to the processor 702. In a notebook configuration, the computer housing includes the touchpad 717, the keyboard 718, and the display 719 all coupled to the processor 702. Other configurations of the computing device may include a computer mouse or trackball coupled to the processor (e.g., via a USB input) as are well known, which may also be used in conjunction with the various embodiments.

Figure 8:
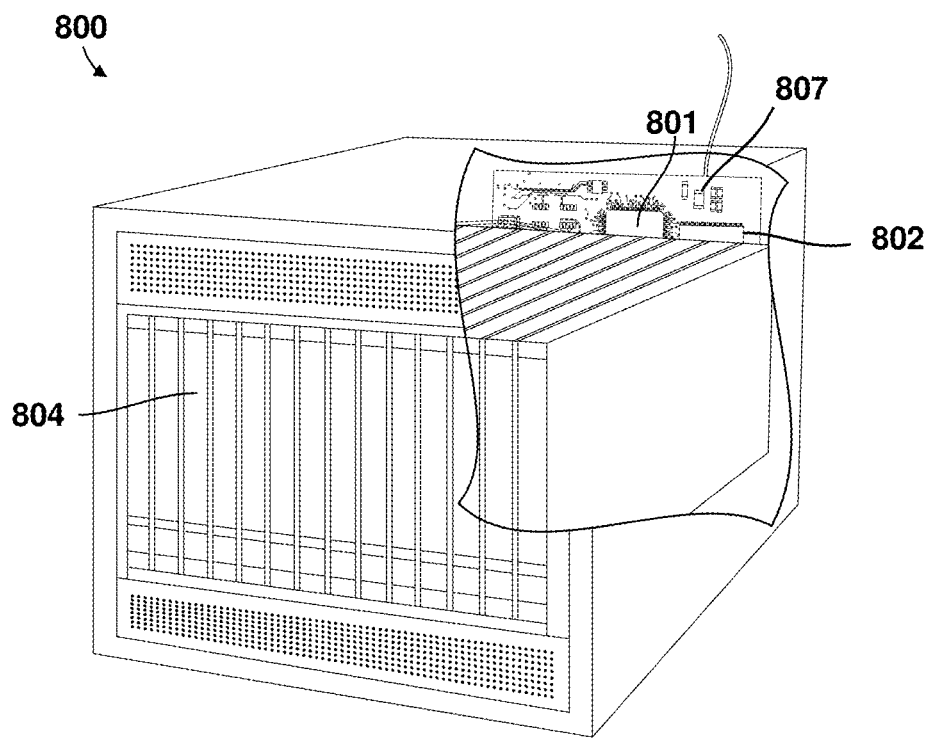
FIG. 8 is a component block diagram illustrating an example server suitable for use with the various embodiments.

The various embodiments (including, but not limited to, embodiments described above with reference to FIGS. 1A-7) may by a variety of vehicle computing system, an example of which is illustrated in FIG. 8. A vehicle computing system 800 typically includes one or more multicore processor assemblies 801 coupled to volatile memory 802 and a large capacity nonvolatile memory, such as a disk drive 804. As illustrated in FIG. 8, multicore processor assemblies 801 may be added to the vehicle computing system 800 by inserting them into the racks of the assembly. The vehicle computing system 800 may also include communication ports 807 coupled to the multicore processor assemblies 801 for exchanging data and commands with a radio module (not shown), such as a local area network coupled to other broadcast system computers and servers, the Internet, the public switched telephone network, and/or a cellular data network (e.g., CDMA, TDMA, GSM, PCS, 3G, 4G, 5G. LTE, or any other type of cellular data network).

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN). Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Implementation examples are described in the following paragraphs. While some of the following implementation examples are described in terms of example methods, further example implementations may include: the example methods discussed in the following paragraphs implemented by a V2X system participant processor that may be an on-board unit, mobile device unit, mobile computing unit, or stationary roadside unit including a processor configured with processor-executable instructions to perform operations of the methods of the following implementation examples; the example methods discussed in the following paragraphs implemented by a V2X system participant including means for performing functions of the methods of the following implementation examples; and the example methods discussed in the following paragraphs may be implemented as a non-transitory processor-readable storage medium having stored thereon processor-executable instructions configured to cause a V2X system participant processor to perform the operations of the methods of the following implementation examples.

Example 1. A method of evaluating V2X information performed by a processor of a V2X system of a vehicle, including: receiving from a V2X entity in a first message a length value and width value of the V2X entity; determining whether the received length value and width value are reliable; performing a position overlap check using the received length value and width value in response to determining that the received length value and width value are reliable.

Example 2. The method of example 1, in which determining whether the received length value and width value are reliable includes; determining whether the width value is less than or equal to the length value; and determining that the received length value and width value are not reliable in response to determining that the received width value exceeds the received length value.

Example 3. The method of example 1 or example 2, further including receiving a cooperative Intelligent Transportation System service (C-ITSS) type value from the V2X entity in the first message, in which determining whether the received length value and width value are reliable includes: receiving from the V2X entity in a second message another length value, another width value, and another C-ITSS type value of the V2X entity; determining whether the length values, width values, and C-ITSS type values received in the first and second messages match; and determining that the received length value and width value are not reliable in response to determining that one or more of the length values, width values, or C-ITSS type values received in the first and second messages do not match.

Example 4. The method of any of examples 1-3, in which determining whether the received length value and width value are reliable includes; comparing the received length value and width value to a length value and width value determined using a vehicle sensor; and determining that the length value and width value determined using the vehicle sensor are not reliable in response to determining that the received length value and width value and the length value and width value determined using a vehicle sensor do not match.

Example 5. The method of any of examples 1-4, further including: in response to determining that the received length value and width value are not reliable; determining for the V2X entity a model stored in the V2X system, in which the model includes a model length value and a model width value; and performing the position overlap check using the model length value and model width value.

Example 6. The method of any of examples 1-5, further including: receiving a heading measurement from a wireless device in the vehicle; determining a vehicle heading; determining whether a difference between the heading measurement and a vehicle heading exceeds a threshold difference; determining that the vehicle heading is reliable in response to determining that the difference between the heading measurement and the vehicle heading does not exceed the threshold difference; and determining that the vehicle heading is not reliable in response to determining that the difference between the heading measurement and the vehicle heading exceeds the threshold difference.

Example 7. The method of example 6, in which performing the position overlap check includes performing the position overlap check using the vehicle heading in response to determining that the vehicle heading is reliable.

Example 8. The method of any of examples 6-7, further including: monitoring variations in the vehicle heading over a period of time; determining that the vehicle heading is reliable in response to determining that variations in the vehicle heading over the period of time does not exceed a variation threshold; and determining that the vehicle heading is not reliable in response to determining that variations in the vehicle heading over the period of time exceeds the variation threshold.

Example 9. The method of example 6, in which determining whether a difference between the heading measurement and a vehicle heading exceeds a threshold difference includes determining whether the difference between the heading measurement and the vehicle heading is within a left deviation threshold and a right deviation threshold; determining that the vehicle heading is reliable includes determining that the vehicle heading is reliable in response to determining that the difference between the heading measurement and the vehicle heading is within the left deviation threshold and the right deviation threshold; and determining that the vehicle heading is not reliable includes determining that the vehicle heading is not reliable in response to determining that the difference between the wireless device heading and the vehicle heading is not within the left deviation threshold and the right deviation threshold.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter." "then." "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM. ROM. EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of evaluating vehicle-to-everything (V2X) information performed by a processor of a V2X system of a vehicle, comprising:
   receiving from a V2X entity in a first message a length value and width value of the V2X entity;
   determining whether the received length value and width value are reliable by:
   determining whether the width value is less than or equal to the length value; and determining that the received length value and width value are not reliable in response to determining that the received width value exceeds the received length value; and performing a position overlap check using the received length value and width value in response to determining that the received length value and width value are reliable.

2. The method of claim 1, further comprising receiving a cooperative Intelligent Transportation System service (C-ITSS) type value from the V2X entity in the first message, wherein determining whether the received length value and width value are reliable comprises:

receiving from the V2X entity in a second message another length value, another width value, and another C-ITSS type value of the V2X entity;

determining whether the length values, width values, and C-ITSS type values received in the first and second messages match; and determining that the received length value and width value are not reliable in response to determining that one or more of the length values, width values, or C-ITSS type values received in the first and second messages do not match.

3. The method of claim 1, wherein determining whether the received length value and width value are reliable comprises:

comparing the received length value and width value to a length value and width value determined using a vehicle sensor; and determining that the length value and width value determined using the vehicle sensor are not reliable in response to determining that the received length value and width value and the length value and width value determined using a vehicle sensor do not match.

4. The method of claim 1, further comprising:
in response to determining that the received length value and width value are not reliable:
determining for the V2X entity a model stored in the V2X system, wherein the model includes a model length value and a model width value; and
performing the position overlap check using the model length value and model width value.

5. The method of claim 1, further comprising:
receiving a heading measurement from a wireless device in the vehicle;
determining a vehicle heading;
determining whether a difference between the heading measurement and a vehicle heading exceeds a threshold difference;
determining that the vehicle heading is reliable in response to determining that the difference between the heading measurement and the vehicle heading does not exceed the threshold difference; and
determining that the vehicle heading is not reliable in response to determining that the difference between the heading measurement and the vehicle heading exceeds the threshold difference.

6. The method of claim 5, wherein performing the position overlap check comprises performing the position overlap check using the vehicle heading in response to determining that the vehicle heading is reliable.

7. The method of claim 5, further comprising:
monitoring variations in the vehicle heading over a period of time;

determining that the vehicle heading is reliable in response to determining that variations in the vehicle heading over the period of time does not exceed a variation threshold; and determining that the vehicle heading is not reliable in response to determining that variations in the vehicle heading over the period of time exceeds the variation threshold.

8. The method of claim 5, wherein:
determining whether a difference between the heading measurement and a vehicle heading exceeds a threshold difference comprises determining whether the difference between the heading measurement and the vehicle heading is within a left deviation threshold and a right deviation threshold;

determining that the vehicle heading is reliable comprises determining that the vehicle heading is reliable in response to determining that the difference between the heading measurement and the vehicle heading is within the left deviation threshold and the right deviation threshold; and determining that the vehicle heading is not reliable comprises determining that the vehicle heading is not reliable in response to determining that the difference between the wireless device heading and the vehicle heading is not within the left deviation threshold and the right deviation threshold.

9. A vehicle-to-everything (V2X) system for use in a V2X system of a vehicle, comprising:
a radio module; and
a processing device coupled to the radio module and configured to:
receive from a V2X entity in a first message a length value and width value of the V2X entity;
determine whether the received length value and width value are reliable by:
determining whether the width value is less than or equal to the length value; and
determining that the received length value and width value are not reliable in response to determining that the received width value exceeds the received length value; and
perform a position overlap check using the received length value and width value in response to determining that the received length value and width value are reliable.

10. The V2X system of claim 9, wherein:
the processing device is further configured to receive a cooperative Intelligent Transportation System service (C-ITSS) type value from the V2X entity in the first message; and
wherein the processing device is further configured to determine whether the received length value and width value are reliable by:
receiving from the V2X entity in a second message another length value, another width value, and another C-ITSS type value of the V2X entity;
determining whether the length values, width values, and C-ITSS type values received in the first and second messages match; and
determining that the received length value and width value are not reliable in response to determining that one or more of the length values, width values, or C-ITSS type values received in the first and second messages do not match.

11. The V2X system of claim 9, wherein the processing device is further configured to determine whether the received length value and width value are reliable by:
  comparing the received length value and width value to a length value and width value determined using a vehicle sensor; and
  determining that the length value and width value determined using the vehicle sensor are not reliable in response to determining that the received length value and width value and the length value and width value determined using a vehicle sensor do not match.

12. The V2X system of claim 9, wherein the processing device is further configured to:
  in response to determining that the received length value and width value are not reliable:
    determine for the V2X entity a model stored in the V2X system, wherein the model includes a model length value and a model width value; and
    perform the position overlap check using the model length value and model width value.

13. The V2X system of claim 9, wherein the processing device is further configured to:
  receive a heading measurement from a wireless device in the vehicle;
  determine a vehicle heading;
  determine whether a difference between the heading measurement and a vehicle heading exceeds a threshold difference;
  determine that the vehicle heading is reliable in response to determining that the difference between the heading measurement and the vehicle heading does not exceed the threshold difference; and
  determine that the vehicle heading is not reliable in response to determining that the difference between the heading measurement and the vehicle heading exceeds the threshold difference.

14. The V2X system of claim 13, wherein the processing device is further configured to perform the position overlap check by performing the position overlap check using the vehicle heading in response to determining that the vehicle heading is reliable.

15. The V2X system of claim 13, wherein the processing device is further configured to:
  monitor variations in the vehicle heading over a period of time;
  determine that the vehicle heading is reliable in response to determining that variations in the vehicle heading over the period of time does not exceed a variation threshold; and
  determine that the vehicle heading is not reliable in response to determining that variations in the vehicle heading over the period of time exceeds the variation threshold.

16. The V2X system of claim 13, wherein the processing device is further configured to:
  determine whether a difference between the heading measurement and a vehicle heading exceeds a threshold difference by determining whether the difference between the heading measurement and the vehicle heading is within a left deviation threshold and a right deviation threshold;
  determine that the vehicle heading is reliable by determining that the vehicle heading is reliable in response to determining that the difference between the heading measurement and the vehicle heading is within the left deviation threshold and the right deviation threshold; and
  determine that the vehicle heading is not reliable by determining that the vehicle heading is not reliable in response to determining that the difference between the wireless device heading and the vehicle heading is not within the left deviation threshold and the right deviation threshold.

17. A vehicle-to-everything (V2X) system for use in a V2X system of a vehicle, comprising:
  means for receiving from a V2X entity in a first message a length value and width value of the V2X entity;
  means for determining whether the received length value and width value are reliable comprising:
    means for determining whether the width value is less than or equal to the length value; and
    means for determining that the received length value and width value are not reliable in response to determining that the received width value exceeds the received length value; and
  means for performing a position overlap check using the received length value and width value in response to determining that the received length value and width value are reliable.

18. The V2X system of claim 17, further comprising means for receiving a cooperative Intelligent Transportation System service (C-ITSS) type value from the V2X entity in the first message,
  wherein means for determining whether the received length value and width value are reliable comprises:
    means for receiving from the V2X entity in a second message another length value, another width value, and another C-ITSS type value of the V2X entity;
    means for determining whether the length values, width values, and C-ITSS type values received in the first and second messages match; and
    means for determining that the received length value and width value are not reliable in response to determining that one or more of the length values, width values, or C-ITSS type values received in the first and second messages do not match.

19. The V2X system of claim 17, wherein means for determining whether the received length value and width value are reliable comprises:
  means for comparing the received length value and width value to a length value and width value determined using a vehicle sensor; and
  means for determining that the length value and width value determined using the vehicle sensor are not reliable in response to determining that the received length value and width value and the length value and width value determined using a vehicle sensor do not match.

20. The V2X system of claim 17, further comprising:
  means for determining for the V2X entity a model stored in the V2X system in response to determining that the received length value and width value are not reliable, wherein the model includes a model length value and a model width value; and
  means for performing the position overlap check using the model length value and model width value.

21. The V2X system of claim 17, further comprising:
  means for receiving a heading measurement from a wireless device in the vehicle;
  means for determining a vehicle heading;
  means for determining whether a difference between the heading measurement and a vehicle heading exceeds a threshold difference;

means for determining that the vehicle heading is reliable in response to determining that the difference between the heading measurement and the vehicle heading does not exceed the threshold difference; and means for determining that the vehicle heading is not reliable in response to determining that the difference between the heading measurement and the vehicle heading exceeds the threshold difference.

22. The V2X system of claim 21, wherein means for performing the position overlap check comprises means for performing the position overlap check using the vehicle heading in response to determining that the vehicle heading is reliable.

23. The V2X system of claim 21, further comprising:
means for monitoring variations in the vehicle heading over a period of time;
means for determining that the vehicle heading is reliable in response to determining that variations in the vehicle heading over the period of time does not exceed a variation threshold; and
means for determining that the vehicle heading is not reliable in response to determining that variations in the vehicle heading over the period of time exceeds the variation threshold.

24. The V2X system of claim 21, wherein
means for determining whether a difference between the heading measurement and a vehicle heading exceeds a threshold difference comprises determining whether the difference between the heading measurement and the vehicle heading is within a left deviation threshold and a right deviation threshold;
means for determining that the vehicle heading is reliable comprises determining that the vehicle heading is reliable in response to determining that the difference between the heading measurement and the vehicle heading is within the left deviation threshold and the right deviation threshold; and
means for determining that the vehicle heading is not reliable comprises determining that the vehicle heading is not reliable in response to determining that the difference between the wireless device heading and the vehicle heading is not within the left deviation threshold and the right deviation threshold.

25. A non-transitory processor-readable medium having stored thereon processor-executable instructions configured to cause a processor of a vehicle-to-everything (V2X) system to perform operations comprising:
receiving from a V2X entity in a first message a length value and width value of the V2X entity;
determining whether the received length value and width value are reliable;
determining whether the width value is less than or equal to the length value;
determining that the received length value and width value are not reliable in response to determining that the received width value exceeds the received length value; and
performing a position overlap check using the received length value and width value in response to determining that the received length value and width value are reliable.

26. The transitory processor-readable medium of claim 25, wherein:
the stored processor-executable instructions are configured to cause a processor of a V2X system to perform operations further comprising receiving a cooperative Intelligent Transportation System service (C-ITSS) type value from the V2X entity in the first message; and
the stored processor-executable instructions are configured to cause a processor of a V2X system to perform operations such that determining whether the received length value and width value are reliable comprises:
receiving from the V2X entity in a second message another length value, another width value, and another C-ITSS type value of the V2X entity;
determining whether the length values, width values, and C-ITSS type values received in the first and second messages match; and
determining that the received length value and width value are not reliable in response to determining that one or more of the length values, width values, or C-ITSS type values received in the first and second messages do not match.

27. The transitory processor-readable medium of claim 25, wherein the stored processor-executable instructions are configured to cause a processor of a V2X system to perform operations further comprising:
receiving a heading measurement from a wireless device in the vehicle;
determining a vehicle heading;
determining whether a difference between the heading measurement and a vehicle heading exceeds a threshold difference;
determining that the vehicle heading is reliable in response to determining that the difference between the heading measurement and the vehicle heading does not exceed the threshold difference; and
determining that the vehicle heading is not reliable in response to determining that the difference between the heading measurement and the vehicle heading exceeds the threshold difference.

* * * * *